US012609431B2

(12) United States Patent
Nishio

(10) Patent No.: US 12,609,431 B2
(45) Date of Patent: Apr. 21, 2026

(54) TRANSMISSION LINE AND ELECTRONIC DEVICE INCLUDING THE SAME

(71) Applicant: Murata Manufacturing Co., Ltd., Nagaokakyo (JP)

(72) Inventor: Kosuke Nishio, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 107 days.

(21) Appl. No.: 18/637,608

(22) Filed: Apr. 17, 2024

(65) Prior Publication Data

US 2024/0275015 A1 Aug. 15, 2024

Related U.S. Application Data

(63) Continuation of application No. PCT/JP2022/048321, filed on Dec. 27, 2022.

(30) Foreign Application Priority Data

Jan. 6, 2022 (JP) ................................ 2022-001176

(51) Int. Cl.
*H01P 3/08* (2006.01)

(52) U.S. Cl.
CPC .................................... *H01P 3/08* (2013.01)

(58) Field of Classification Search
CPC .................................... H01P 3/08; H01P 3/00
USPC ................................................ 333/239, 238
See application file for complete search history.

(56) References Cited

U.S. PATENT DOCUMENTS

| | | | | |
|---|---|---|---|---|
| 11,037,701 | B2 * | 6/2021 | Baba | H01B 11/002 |
| 2010/0225425 | A1 | 9/2010 | Cho | |
| 2015/0055307 | A1 | 2/2015 | Shaw et al. | |
| 2021/0068268 | A1 | 3/2021 | Nagai et al. | |

FOREIGN PATENT DOCUMENTS

| | | | |
|---|---|---|---|
| JP | 5042327 | B2 | 10/2012 |
| JP | 2016100495 | A | 5/2016 |
| JP | 2016119506 | A | 6/2016 |
| WO | 2019235558 | A1 | 12/2019 |

OTHER PUBLICATIONS

International Search Report in PCT/JP2022/048321, mailed Feb. 28, 2023, 3 pages.
Written Opinion in PCT/JP2022/048321, mailed Feb. 28, 2023, 5 pages.

* cited by examiner

*Primary Examiner* — Andrea Lindgren Baltzell
*Assistant Examiner* — Abigail Amir Yaldo
(74) *Attorney, Agent, or Firm* — Keating & Bennett, LLP

(57) ABSTRACT

A transmission line includes an insulator including at least one insulator layer, and first and second conductor patterns located in or on the insulator layer and arranged at positions different from each other in a thickness direction of the insulator layer. The first conductor pattern includes a first signal line and a second signal line each extending along a signal transmission direction. The second conductor pattern includes a first counter electrode and a second counter electrode. The first counter electrode overlaps the first signal line but does not overlap the second signal line when viewed in the thickness direction. The second counter electrode overlaps the second signal line but does not overlap the first signal line when viewed in the thickness direction.

19 Claims, 23 Drawing Sheets

TRANSMISSION LINE AND ELECTRONIC DEVICE INCLUDING THE SAME

CROSS REFERENCE TO RELATED APPLICATIONS

This application claims the benefit of priority to Japanese Patent Application No. 2022-001176, filed on Jan. 6, 2022, and is a Continuation Application of PCT Application No. PCT/JP2022/048321, filed on Dec. 27, 2022. The entire contents of each application are hereby incorporated herein by reference.

BACKGROUND OF THE INVENTION

1. Field of the Invention

The present invention relates to transmission lines each including a signal conductor and electronic devices each including a transmission line.

2. Description of the Related Art

An example of existing inventions related to a transmission line includes a coplanar waveguide structure described in Japanese Patent No. 5042327. The coplanar waveguide structure has a structure in which grounds are arranged on both sides to sandwich a plurality of signal lines, and floating electrodes are arranged above and/or below the grounds and the signal lines.

However, in a transmission line using the coplanar waveguide structure described in Japanese Patent No. 5042327, there is a concern that the isolation or coupling of the plurality of signal lines may be generated to cause interference.

SUMMARY OF THE INVENTION

Example embodiments of the present invention provide transmission lines each able to reduce or prevent interference between a plurality of signal lines, and electronic devices including such transmission lines.

A transmission line according to an example embodiment of the present invention includes an insulator including at least one insulator layer, and a first conductor pattern and a second conductor pattern in or on the insulator layer and arranged at positions different from each other in a thickness direction of the insulator layer. The first conductor pattern includes a first signal line and a second signal line each extending along a signal transmission direction. The second conductor pattern includes a first counter electrode and a second counter electrode. The first counter electrode overlaps the first signal line but does not overlap the second signal line when viewed in the thickness direction. The second counter electrode overlaps the second signal line but does not overlap the first signal line when viewed in the thickness direction.

An electronic device according to an example embodiment of the present invention includes a transmission line according to an example embodiment of the present invention.

With the transmission lines and the electronic devices according to example embodiments of the present invention, interference between the plurality of signals is able to be reduced or prevented.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

First Example Embodiment

Figure 1:
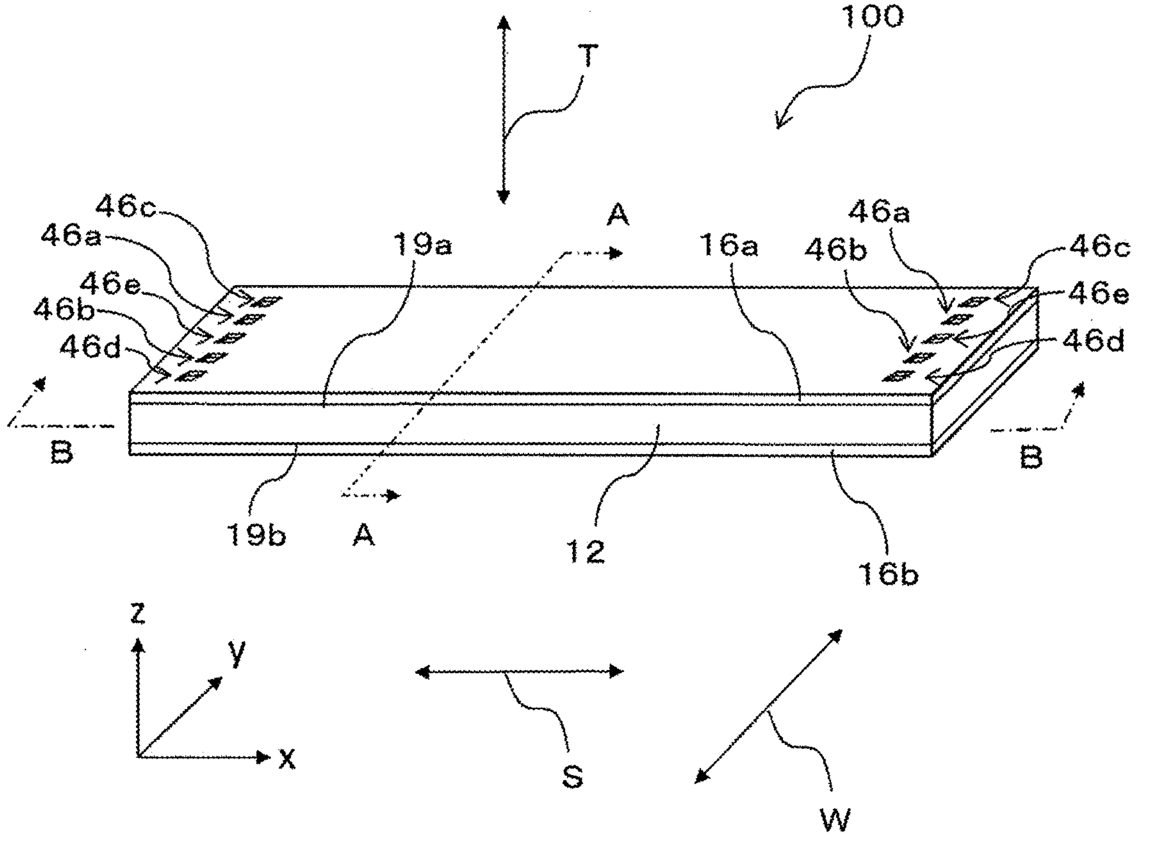
FIG. 1 is a perspective view showing the external appearance of a transmission line according to a first example embodiment of the present invention.
Figure 2A:
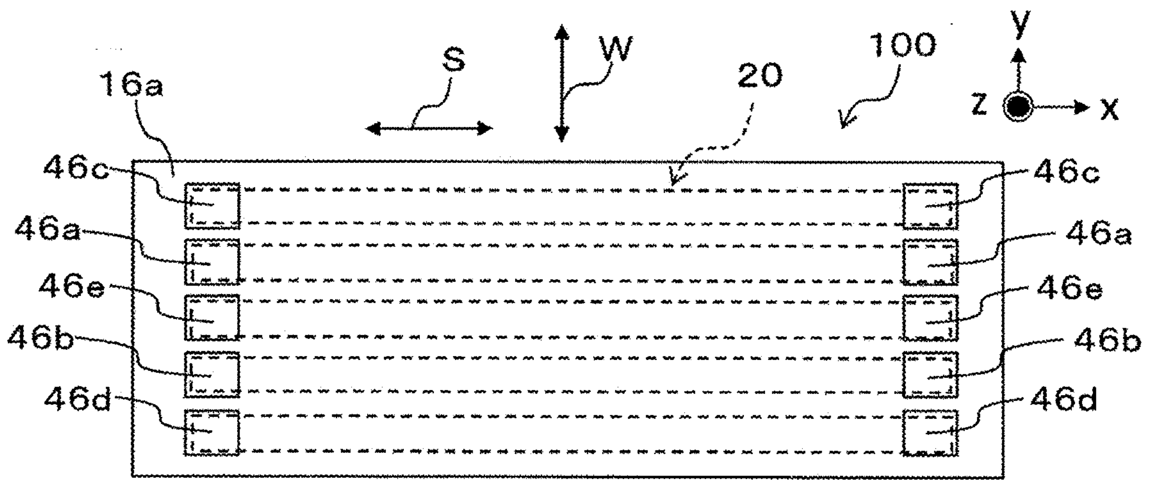
FIG. 2A is a top view showing one layer of the transmission line according to the first example embodiment of the present invention.
Figure 2B:
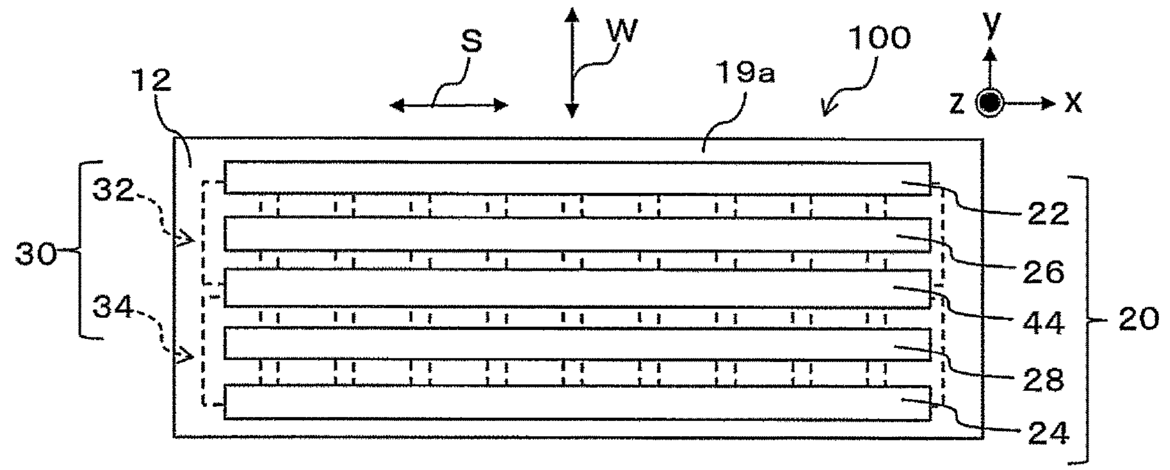
FIG. 2B is a top view showing another layer of the transmission line according to the first example embodiment of the present invention.
Figure 2C:
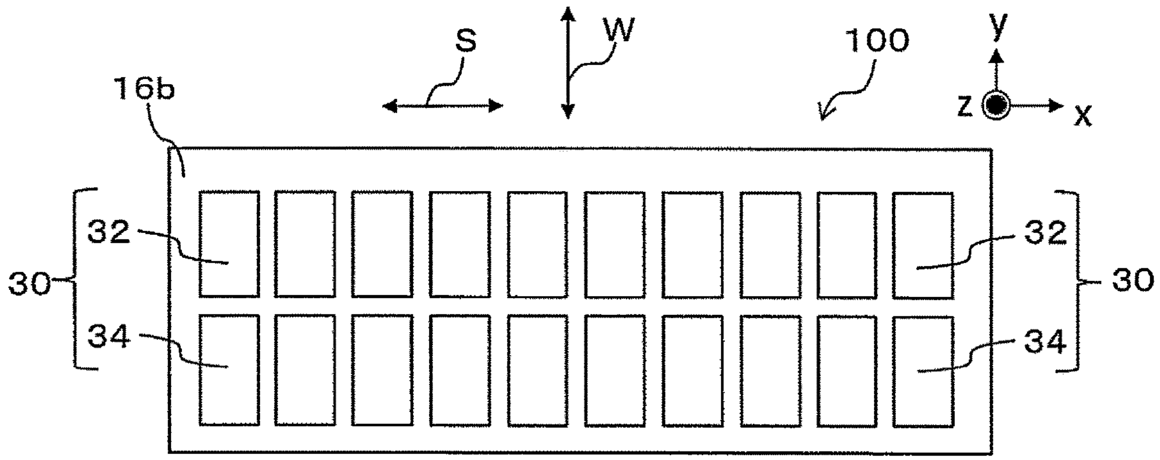
FIG. 2C is a top view showing further another layer of the transmission line according to the first example embodiment of the present invention.
Figure 3:
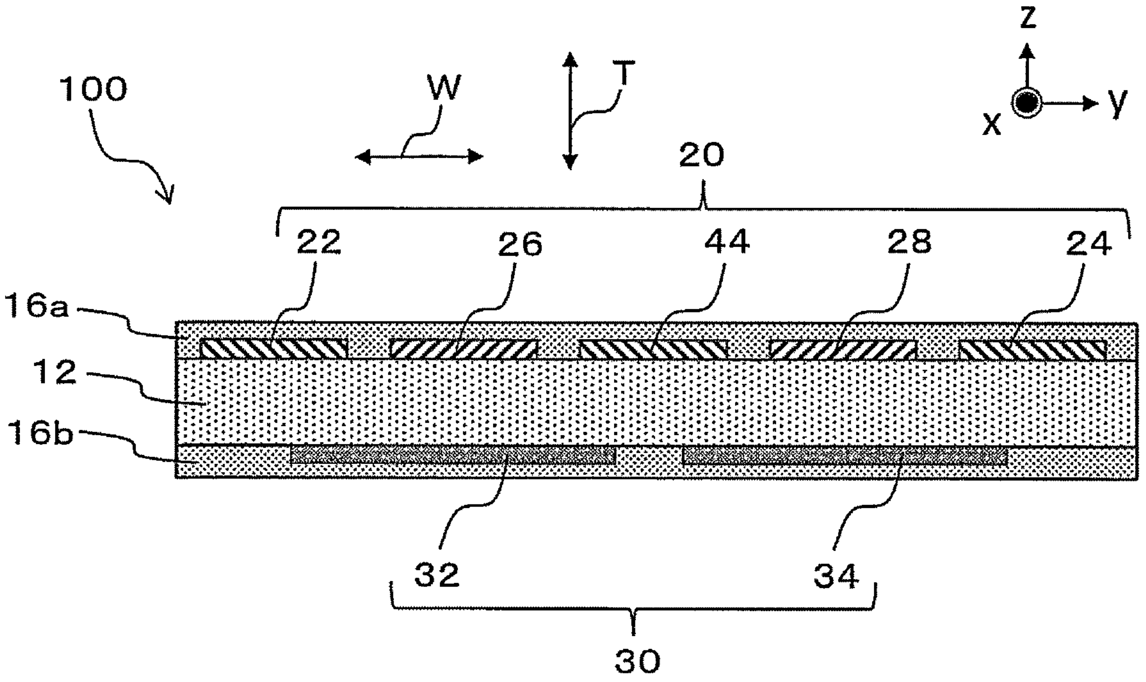
FIG. 3 is an A-A sectional view of FIG. 1.
Figure 4:
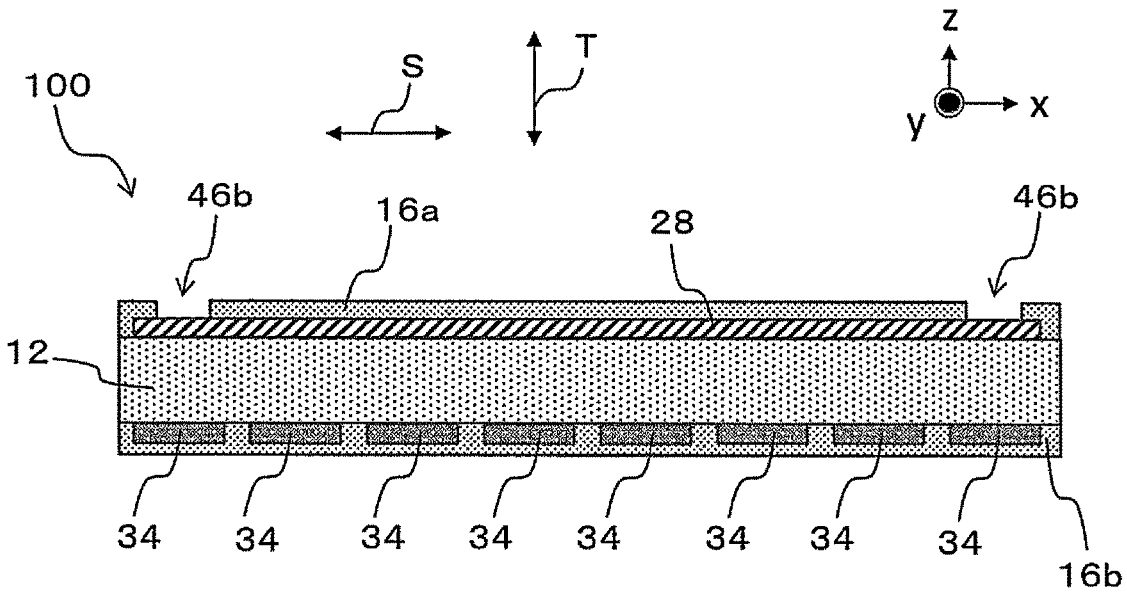
FIG. 4 is a B-B sectional view of FIG. 1.

The structure of a transmission line 100 and an electronic device 1380 according to a first example embodiment of the present invention will be described below with reference to the drawings. FIG. 1 is a perspective view showing the external appearance of the transmission line 100. FIGS. 2A to 2C are top views showing respective layers of the transmission line 100 when viewed in the thickness direction. FIG. 3 is an A-A sectional view of the transmission line 100, and FIG. 4 is a B-B sectional view of the transmission line 100.

In the present specification, directions are defined as follows. First, the X-axis direction corresponds to a signal transmission direction S of the transmission line 100, the Y-axis direction corresponds to a width direction W of the transmission line 100, and the Z-axis direction corresponds to a thickness direction T of the transmission line 100. The signal transmission direction S is a direction in which signal lines 26 and 28 (FIG. 2B), which are described later, extend and is orthogonal or substantially orthogonal to the thickness direction T, when viewed in the thickness direction T. The width direction W is a direction orthogonal or substantially orthogonal to the direction in which the signal lines 26 and 28 extend, when viewed in the thickness direction T. The thickness direction T is a stacking direction in which at least one insulator layer 12 is stacked. The thickness direction T, the width direction W, and the signal transmission direction S are orthogonal or substantially orthogonal to each other. The thickness direction T, the width direction W, and the signal transmission direction S in the present specification need not coincide with the thickness direction, the width direction, and the signal transmission direction of the transmission line 100 in actual use.

The definitions of terms in the present specification will be described below. First, the positional relationships between elements in the present specification will be defined. In the present specification, the expression "A and B are electrically connected to each other" means that electricity can be conducted between A and B. Therefore, A and B may be in contact with each other, or A and B do not need to be in contact with each other. For example, when a conductive C is disposed between A and B, A and B are electrically connected via C even though A and B are not in contact with each other. On the other hand, in the present specification, the expression "A and B are in contact each other" means that the surfaces of A and B are in direct contact with each other.

First, the structure of the transmission line 100 is described with reference to FIG. 1. The transmission line 100 is a transmission line for transmitting high-frequency signals. The transmission line 100 is, for example, a multi-layer substrate for electrically connecting two circuits in an electronic device such as a smartphone. The transmission line 100 of the first example embodiment has a belt shape extending in the signal transmission direction S, as shown in FIG. 1.

The transmission line 100 shown in FIG. 1 includes a protective film 16*a*, the insulator layer 12, and a protective film 16*b*, in this order along the thickness direction T.

The insulator layer 12 has a plate shape, as shown in FIG. 1. Thus, the insulator layer 12 includes a first main surface 19*a* and a second main surface 19*b* that are separated from each other in the thickness direction T. The first main surface 19*a* may also be referred to as an upper main surface and the second main surface 19*b* may also be referred to as a lower main surface. The insulator layer 12 has a structure in which the protective films 16*a* and 16*b* are stacked thereon in the thickness direction T. Specifically, the protective film 16*a* is stacked on the first main surface 19*a*, and the protective film 16*b* is stacked on the second main surface 19*b*. The insulator layer 12 is, for example, a flexible dielectric sheet. The material of the insulator layer 12 is, for example, a resin. In the present example embodiment, the material of the insulator layer 12 is, for example, a thermoplastic resin. Examples of the thermoplastic resin include liquid crystal polymers and PTFE (polytetrafluoroethylene). The material of the insulator layer 12 may be, for example, polyimide.

In the first example embodiment, one insulator layer 12 is provided as an insulator. The insulator layer 12 is not limited to a single layer, and a plurality of insulator layers 12 may be stacked in the thickness direction T. A component defined by arranging or stacking one or a plurality of insulator layers 12 in the thickness direction T may be referred to as an "insulator".

The protective film 16*a* protects a conductor (a first conductor pattern 20) arranged on the first main surface 19*a* of the insulator layer 12. The protective film 16*b* protects a conductor (a second conductor pattern 30) arranged on the second main surface 19*b* of the insulator layer 12. The protective films 16*a* and 16*b* preferably cover the entire or substantially the entire surface of the main surfaces 19*a* and 19*b* of the insulator layer 12, respectively. The protective films 16*a* and 16*b* of the first example embodiment are, for example, resin resists applied on the insulator layer 12. However, the protective films 16*a* and 16*b* may be, for example, coverlays attached on the insulator layer 12.

As shown in FIG. 1, the protective film 16*a* is provided with a plurality of openings 46*a* to 46*e*. The openings 46*a* to 46*e* are to connect the first conductor pattern 20 to the outside, where interlayer connecting conductors such as via conductors (not shown) are disposed.

As shown in FIG. 2A, a portion of the first conductor pattern 20 is exposed from the openings 46*a* to 46*e* provided in the protective film 16*a*. In FIGS. 2A to 2C, the components in different layers in the thickness direction T are distinguished by solid lines and dotted lines.

As shown in FIG. 2B, the first conductor pattern 20 is a conductor pattern provided on the first main surface 19*a* of the insulator layer 12, and includes a plurality of conductors each extending in the signal transmission direction S. The first conductor pattern 20 includes a first ground conductor 22, a second ground conductor 24, a third ground conductor 44, the first signal line 26, and the second signal line 28.

The first signal line 26 and the second signal line 28 are each a conductor to transmit signals, and transmit respective different signals. The first signal line 26 and the second signal line 28 of the first example embodiment each transmit high-frequency signals. Two end portions of the first signal line 26 in the signal transmission direction S are exposed from the respective two openings 46*a* shown in FIG. 2A. Two end portions of the second signal line 28 in the signal transmission direction S are exposed from the respective two openings 46*b* shown in FIG. 2A.

The first ground conductor 22, the second ground conductor 24, and the third ground conductor 44 are each a conductor connected to a ground potential, which is a reference potential. The ground conductors 22, 24, and 44 provide a shielding function to reduce or prevent signal interference between the signal lines 26 and 28. The ground conductors 22, 24, and 44 may be connected to the reference potential in any manner, for example, as a frame ground with respect to the chassis of an electronic device (not shown) incorporating the transmission line 100.

Two end portions of the first ground conductor 22 in the signal transmission direction S are exposed from the respective two openings 46*c* shown in FIG. 2A. Similarly, two end portions of the second ground conductor 24 in the signal transmission direction S are exposed from the respective two openings 46*d* shown in FIG. 2A, and two end portions of the third ground conductor 44 in the signal transmission direction S are exposed from the respective two openings 46*e* shown in FIG. 2A.

As shown in FIG. 2B, the first conductor pattern 20 includes the first ground conductor 22, the first signal line 26, the third ground conductor 44, the second signal line 28, and the second ground conductor 24 arranged in this order along the width direction W. The first signal line 26 is located between the first ground conductor 22 and the third ground conductor 44, and the second signal line 28 is located between the second ground conductor 24 and the third ground conductor 44.

As shown in FIG. 2B, the first conductor pattern 20 and the second conductor pattern 30 are arranged to overlap each other when viewed in the thickness direction T.

As shown in FIG. 2C, the second conductor pattern 30 is a conductor pattern provided on the upper surface of the protective film 16*b*, i.e., the second main surface 19*b* of the insulator layer 12. The second conductor pattern 30 is covered by the protective film 16*b* in a state of being fixed to the second main surface 19*b* of the insulator layer 12.

The first conductor pattern 20 and the second conductor pattern 30 are preferably conductor layers formed by patterning metal foils attached to the main surfaces 19*a* and 19*b* of the insulator layer 12, respectively. The metal foil is, for example, copper foil.

As shown in FIG. 2C, the second conductor pattern 30 includes a first counter electrode 32 and a second counter electrode 34.

The first counter electrode 32 and the second counter electrode 34 are electrodes arranged to oppose the first conductor pattern 20 in the thickness direction T. The first counter electrode 32 includes a plurality of conductors periodically arranged at intervals along the signal transmission direction S. Similarly, the second counter electrode 34 includes a plurality of conductors periodically arranged at intervals along the signal transmission direction S.

In the first example embodiment, the individual counter electrodes 32 and 34 are rectangular or substantially rectangular in plan view and have a longitudinal direction along the width direction W and a lateral direction along the signal transmission direction S. The individual counter electrodes 32 and 34 are set to the same or substantially the same dimensions. The positions of the plurality of first counter electrodes 32 in the width direction W are the same or substantially the same, and the positions of the plurality of second counter electrodes 34 in the width direction W are the same or substantially the same.

As shown in FIGS. 2B and 3, the plurality of first counter electrodes 32 are arranged to oppose the first ground conductor 22, the first signal line 26, and the third ground conductor 44 when viewed in the thickness direction T. The plurality of second counter electrodes 34 are arranged to oppose the third ground conductor 44, the second signal line 28, and the second ground conductor 24 when viewed in the thickness direction T.

The first counter electrode 32 preferably overlaps the first signal line 26 but does not overlap the second signal line 28 when viewed in the thickness direction T. The second counter electrode 34 preferably overlaps the second signal line 28 but does not overlap the first signal line 26 when viewed in the thickness direction T. With such an arrangement, the interference between the signal lines 26 and 28 via the counter electrodes 32 and 34 can be reduced or prevented and isolation or coupling can be improved compared to a case where one of the counter electrodes 32 and 34 faces both of the signal lines 26 and 28.

The first counter electrode 32 and the second counter electrode 34 extend orthogonally or substantially orthogonally to the first conductor pattern 20 when viewed in the thickness direction T.

In the first example embodiment, the plurality of first counter electrodes 32 and the plurality of second counter electrodes 34 are each a floating conductor. The floating conductor is a conductor connected to a floating potential. The floating conductor is not connected to a specific potential (reference potential or ground potential) such as, for example, a ground potential or a power supply potential, and may also be referred to as a floating electrode.

As shown in FIG. 2B and FIG. 3, the first ground conductor 22 overlaps the plurality of first counter electrodes 32 but does not overlap the plurality of second counter electrodes 34 when viewed in the thickness direction T. The second ground conductor 24 overlaps the plurality of second counter electrodes 34, but does not overlap the plurality of first counter electrodes 32, when viewed in the thickness direction T.

The third ground conductor 44 overlaps both the first counter electrodes 32 and the second counter electrodes 34, when viewed in the thickness direction T. The third ground conductor 44 of the first example embodiment consists of a single conductor portion that overlaps both the first counter electrodes 32 and the second counter electrodes 34. The present invention is not limited to such a case, but includes a case where the third ground conductor 44 overlaps one of the first counter electrodes 32 and the second counter electrodes 34, but does not overlap the other, when viewed in the thickness direction T.

As described above, the transmission line 100 of the first example embodiment includes the insulator layer 12 (insulator), and the first conductor pattern 20 and the second conductor pattern 30 provided on the insulator layer 12 at different positions from each other in the thickness direction T of the insulator layer 12. The first conductor pattern 20 includes the first signal line 26 and the second signal line 28 each extending along the signal transmission direction S, and the second conductor pattern 30 includes the first counter electrodes 32 and the second counter electrodes 34. The first counter electrode 32 overlaps the first signal line 26 but does not overlap the second signal line 28 when viewed in the thickness direction T, and the second counter electrode 34 overlaps the second signal line 28 but does not overlap the first signal line 26 when viewed in the thickness direction T.

With such an arrangement, when a certain counter electrode overlaps both the first signal line 26 and the second signal line 28 in the transmission line 100 when viewed in the thickness direction T, there is a concern that the first signal line 26 and the second signal line 28 may interfere with each other via that counter electrode, thereby deteriorating the isolation or coupling. With the structure described in the present example embodiment, the isolation or coupling of the first signal line 26 and the second signal line 28 can be improved.

In other words, the first counter electrode 32 overlapping the first signal line 26 contributes to the isolation or coupling of the first signal line 26, and the second counter electrode 34 overlapping the second signal line 28 contributes to isolation or coupling of the second signal line 28. If one of the counter electrodes 32 and 34 overlaps both of the first signal line 26 and the second signal line 28, there is a concern that the first signal line 26 and the second signal line 28 may interfere with each other via the counter electrodes 32 and 34. In contrast, by arranging the counter electrodes so that one counter electrode only overlap one signal line, the isolation or coupling between the plurality of signal lines 26 and 28 can be improved.

In the first example embodiment, the first conductor pattern 20 further includes the ground conductors 22 and 24. With the present configuration, the isolation or coupling of the first signal line 26 and the second signal line 28 can be improved.

In the first example embodiment, the ground conductors 22 and 24 are connected to the reference potential. With the present configuration, shielding performance can be improved.

In the first example embodiment, the transmission line 100 includes the first ground conductor 22 corresponding to the first signal line 26 and the second ground conductor 24 corresponding to the second signal line 28. With the present configuration, the isolation or coupling of the first signal line 26 and the second signal line 28 can be improved.

In the first example embodiment, both the plurality of first counter electrodes 32 and the plurality of second counter electrodes 34 are preferably provided at intervals along the signal transmission direction S. With the present configuration, current is less likely to flow in the signal transmission direction S in the first counter electrodes 32 and the second counter electrodes 34, thereby reducing transmission loss. The present invention is not limited to the case where both of the plurality of first counter electrodes 32 and the plurality of second counter electrodes 34 are provided at intervals along the signal transmission direction S, but includes a case where at least one of the first counter electrodes 32 and the second counter electrodes 34 is provided at intervals along the signal transmission direction S.

In the first example embodiment, each of the first counter electrode 32 and the second counter electrode 34 has a shorter length in the signal transmission direction S (lateral direction) than in the width direction W (longitudinal direction), when viewed in the thickness direction T. In other words, the counter electrodes 32 and 34 (floating electrodes) each have a shape that extends in a direction (width direction W) different from the direction in which the signal lines 26 and 28 extend (the signal transmission direction S). With the present configuration, current is much less likely to flow in the signal transmission direction S in the first counter electrodes 32 and the second counter electrodes 34, thus reducing transmission loss.

In the first example embodiment, the lengths of the first counter electrode 32 and the second counter electrode 34 in the signal transmission direction S, when viewed in the thickness direction T, are sufficiently small relative to the wavelength of the signals transmitted through the first signal line 26 and the second signal line 28. Thus, the flow of current in the signal transmission direction S can be controlled and transmission loss can be reduced.

In the first example embodiment, the first signal line 26 and the second signal line 28 are for high-frequency signals, and high-frequency signals are transmitted through the first signal line 26 and the second signal line 28. Thus, improvement in the isolation or coupling of the first signal line 26 and the second signal line 28 and reduction in transmission loss can be expected. Signals different from high-frequency signals (for example, low-frequency signals) may be transmitted through the first signal line 26 and the second signal line 28.

In the first example embodiment, the first counter electrode 32 and the second counter electrode 34 are floating conductors and are not connected to the reference potential. Thus, the manufacturing of the transmission line 100, including the counter electrodes 32 and 34, is facilitated. The first counter electrode 32 and the second counter electrode 34 are not limited to being floating conductors, but may be ground conductors connected to a ground potential to improve shielding function. Of the first counter electrode 32 and the second counter electrode 34, for example, one counter electrode may be a floating conductor and the other may be a ground conductor. In other words, the first counter electrode 32 and/or the second counter electrode 34 may be floating conductors, or the first counter electrode 32 and/or the second counter electrode 34 may be ground conductors.

In the first example embodiment, the third ground conductor 44 is provided between the first signal line 26 and the second signal line 28, when viewed in the thickness direction T. Thus, direct interference between the first signal line 26 and the second signal line 28 can be reduced or prevented and the isolation or coupling of the first signal line 26 and the second signal line 28 can be improved.

In the first example embodiment, the third ground conductor 44 preferably includes one conductor portion that overlaps both the first counter electrode 32 and the second counter electrode 34, when viewed in the thickness direction T. Thus, the third ground conductor 44 can be easily manufactured while improving isolation. The third ground conductor 44 is not limited to a single conductor portion, and may include a plurality of conductor portions. Alternatively, the first signal line 26 and the second signal line 28 may directly face each other without the third ground conductor 44 disposed there between.

In the first example embodiment, as shown in FIG. 3, in the first conductor pattern 20, the first signal line 26 is sandwiched between two ground conductors 22 and 44, and the second signal line 28 is sandwiched between two ground conductors 24 and 44. With such a waveguide structure, noise can be more effectively reduced or prevented and higher shielding performance can be achieved compared to a structure in which the ground conductor 44 is not provided.

Second Example Embodiment

A transmission line 200 according to a second example embodiment of the present invention is described below with reference to the drawings. In the second example embodiment, the explanation of the contents that overlap the first example embodiment will be omitted as appropriate. The same is true for the subsequent example embodiments after the second example embodiment.

Figure 5:
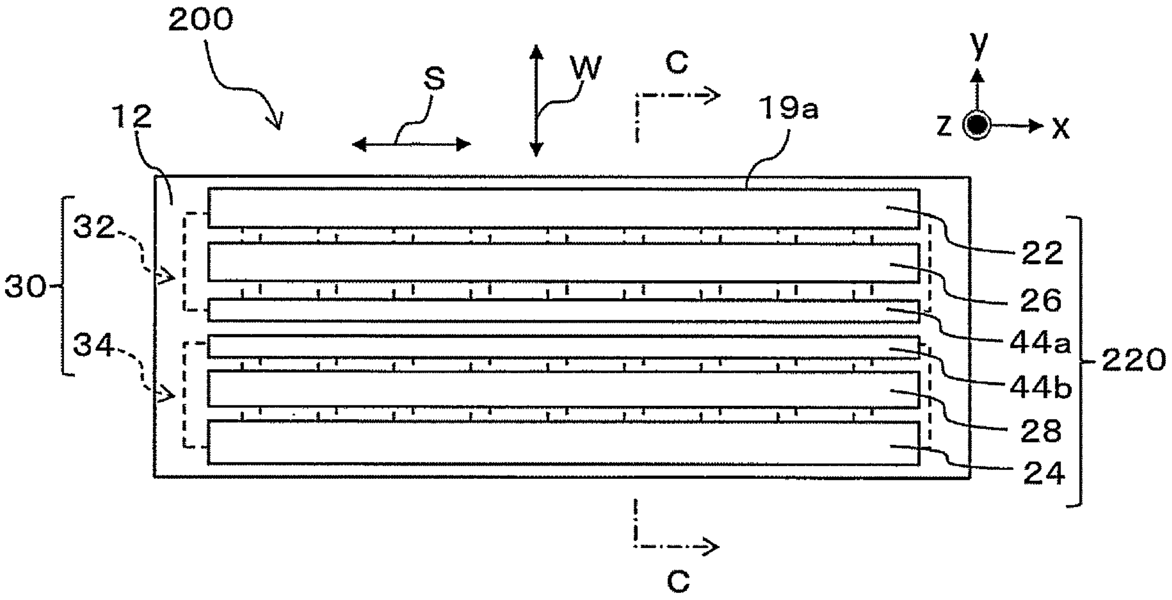
FIG. 5 is a top view showing one layer of a transmission line according to a second example embodiment of the present invention.
Figure 6:
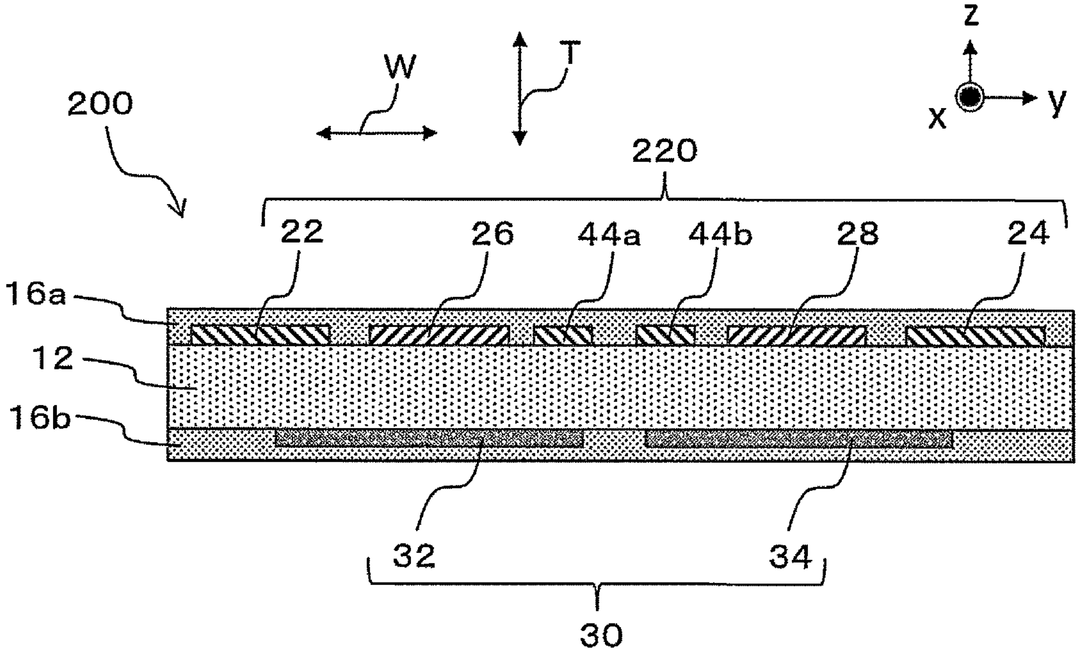
FIG. 6 is a longitudinal sectional view of the transmission line according to the second example embodiment of the present invention.

FIG. 5 is a top view showing the layer on a first main surface 19*a* of an insulator layer 12 of the transmission line 200, and FIG. 6 is a longitudinal sectional view (a C-C sectional view) of the transmission line 200.

The transmission line 200 according to the second example embodiment differs from the transmission line 100 according to the first example embodiment in that the third ground conductor 44 is divided into a plurality of ground conductors 44*a* and 44*b*.

As shown in FIGS. 5 and 6, a first conductor pattern 220 of the transmission line 200 includes two third ground conductors 44*a* and 44*b* between a first signal line 26 and a second signal line 28.

The third ground conductor 44*a* is a ground conductor that overlaps a plurality of first counter electrodes 32 of a second conductor pattern 30 when viewed in the thickness direction T. The third ground conductor 44*b* is a ground conductor that overlaps a plurality of second counter electrodes 34 of the second conductor pattern 30 when viewed in the thickness direction T. The third ground conductor 44*a* overlaps the first counter electrodes 32, but does not overlap the second counter electrodes 34. The third ground conductor 44*b* overlaps the second counter electrodes 34, but does not overlap the first counter electrodes 32.

With the above configuration, the third ground conductor 44*a* mainly functions to absorb the noise generated from the first signal line 26 directly opposing the third ground conductor 44*a* in the width direction W, and the third ground conductor 44*b* mainly functions to absorb the noise generated from the second signal line 28 directly opposing the third ground conductor 44*b* in the width direction W. By dividing the third ground conductor into the plurality of third ground conductors 44*a* and 44*b*, direct interference of the first signal line 26 and the second signal line 28 on the first main surface 19*a* can be reduced or prevented, and isolation or coupling can be improved.

In the second example embodiment, the ground conductors 44*a* and 44*b* are provided corresponding to the counter electrodes 32 and 34, respectively. Specifically, as shown in FIG. 6, the third ground conductor 44*a* is provided at a position overlapping the first counter electrodes 32 in the thickness direction T, and the Third ground conductor 44*b* is provided at a position overlapping the second counter electrodes 34 in the thickness direction T. Thus, isolation or coupling can be further improved.

Third Example Embodiment

A transmission line 300 according to a third example embodiment of the present invention is described below with reference to the drawings.

Figure 7:
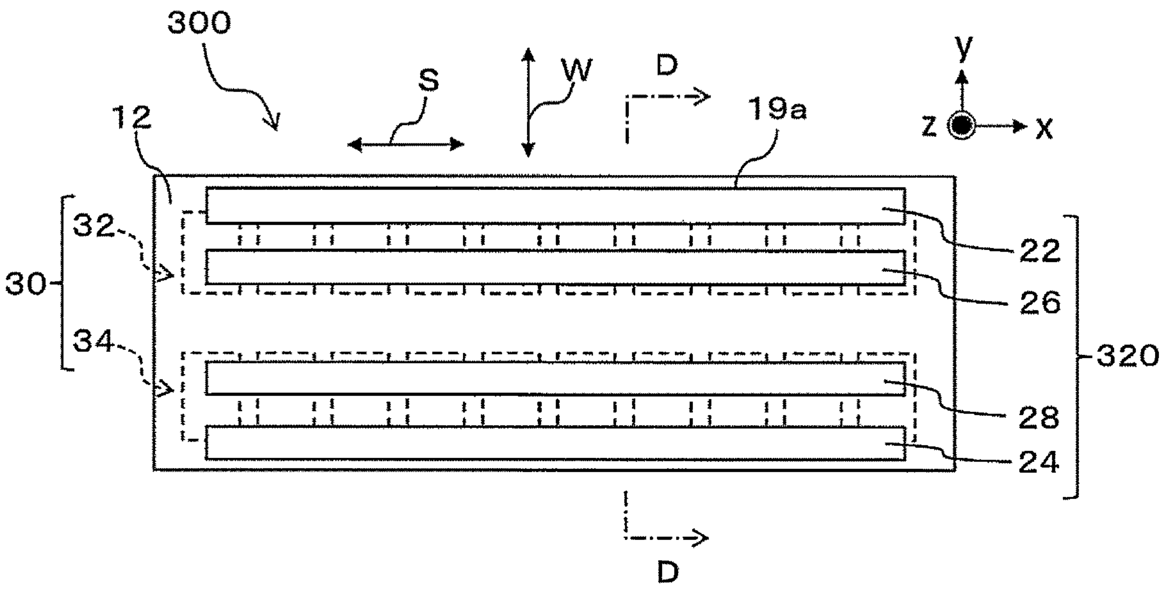
FIG. 7 is a top view showing one layer of a transmission line according to a third example embodiment of the present invention.
Figure 8:
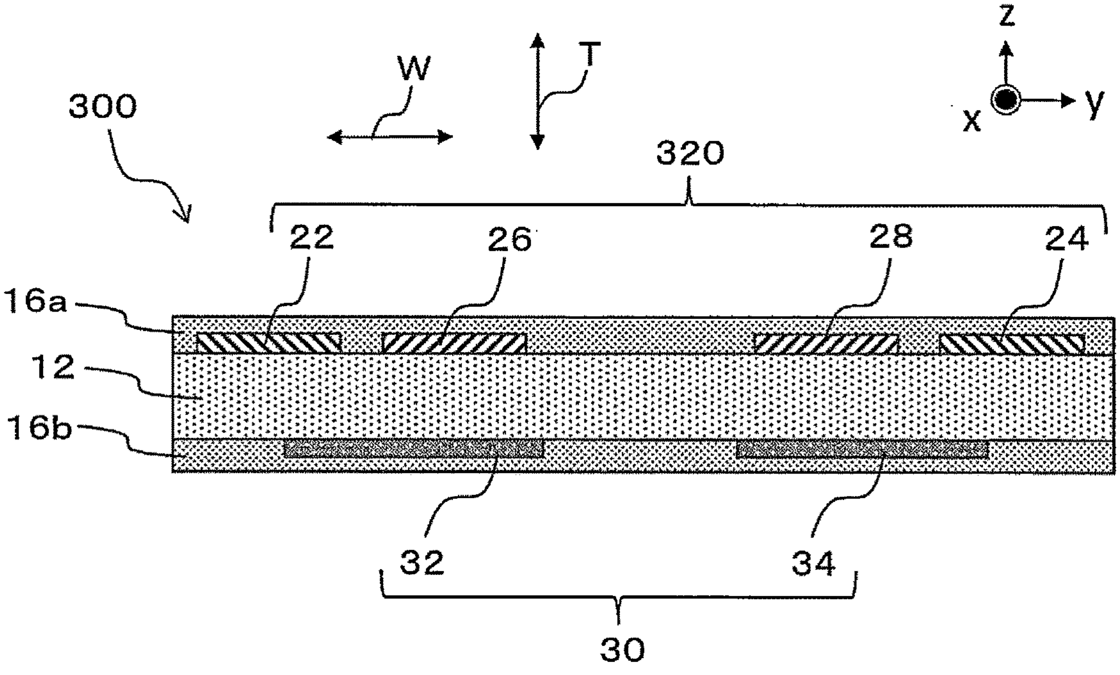
FIG. 8 is a longitudinal sectional view of the transmission line according to the third example embodiment of the present invention.

FIG. 7 is a top view showing the layer on a first main surface 19*a* of an insulator layer 12 of the transmission line 300, and FIG. 8 is a longitudinal sectional view (a D-D sectional view) of the transmission line 300.

The transmission line 300 according to the third example embodiment differs from the transmission line 100 according to the first example embodiment in that the third ground conductor 44 is not provided.

As shown in FIGS. 7 and 8, a first conductor pattern 320 of the transmission line 300 includes no ground conductors 44*a* and 44*b* between a first signal line 26 and a second signal line 28, and the first signal line 26 and the second signal line 28 directly oppose each other in the width direction W.

With the above configuration, no ground conductor is provided between the first signal line 26 and the second signal line 28, thus simplifying the configuration and reducing the manufacturing cost. Further, the external shape of the transmission line 300 can be reduced. In the present configuration, a first ground conductor 22, a second ground conductor 24, first counter electrodes 32, and second counter electrodes 34 provide the shielding function for the first signal line 26 and the second signal line 28.

Fourth Example Embodiment

A transmission line 400 according to a fourth example embodiment of the present invention is described below with reference to the drawings.

Figure 9:
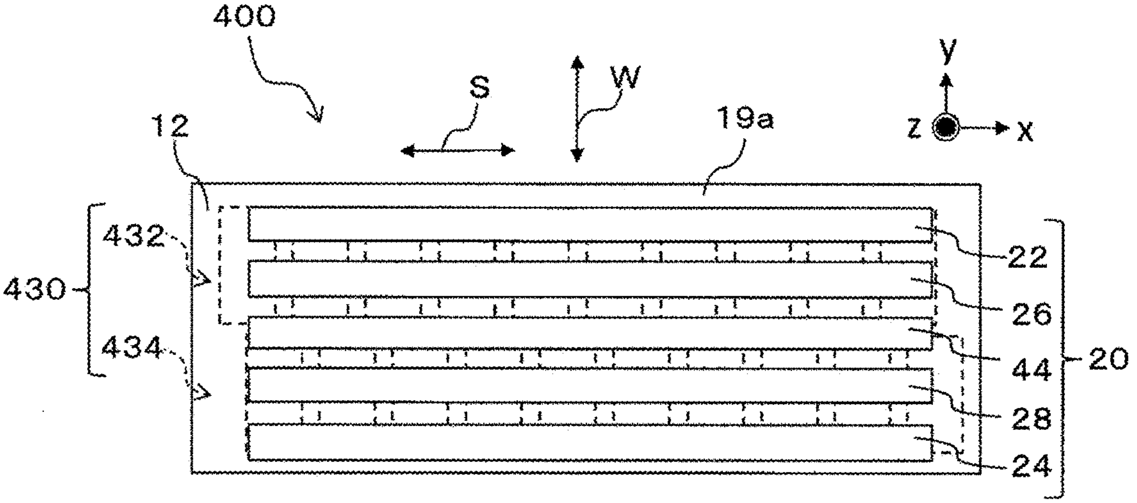
FIG. 9 is a top view showing one layer of a transmission line according to a fourth example embodiment of the present invention.
Figure 10:
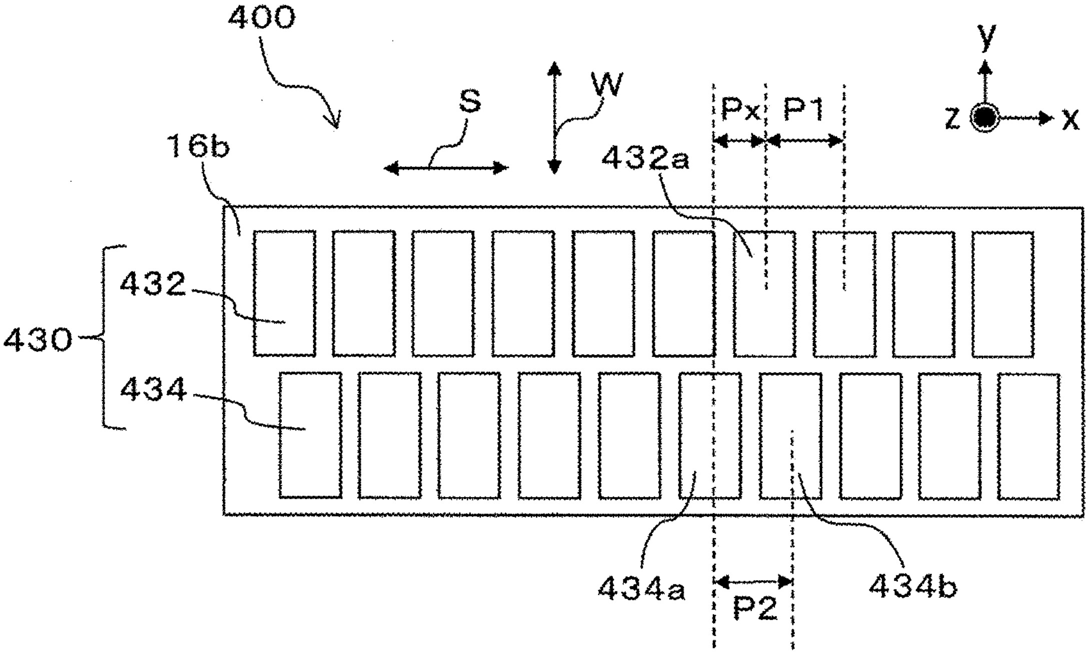
FIG. 10 is a top view showing another layer of the transmission line according to the fourth example embodiment of the present invention.

FIG. 9 is a top view showing the layer on a first main surface 19*a* of an insulator layer 12 of the transmission line 400, and FIG. 10 is a top view of the layer of a protective film 16*b*, i.e., the layer on a second main surface 19*b* of the insulator layer 12, of the transmission line 400.

The transmission line 400 according to the fourth example embodiment differs from the transmission line 100 according to the first example embodiment in that a plurality of first counter electrodes 432 and a plurality of second counter electrodes 434 are arranged at positions deviated from each other in the signal transmission direction S.

As shown in FIGS. 9 and 10, the plurality of first counter electrodes 432 overlapping a first signal line 26 and the plurality of second counter electrodes 434 overlapping a second signal line 28 are arranged at positions deviated from each other in the signal transmission direction S.

As shown in FIG. 10, a certain first counter electrode 432*a* overlaps two adjacent second counter electrodes 434*a* and 434*b* when viewed in the width direction W. The first counter electrode 432*a* has an area that overlaps the second counter electrode 434*a* and an area that does not overlap the second counter electrode 434*a* in the width direction W. Similarly, the first counter electrode 432*a* has an area that overlaps the second counter electrode 434*b* and an area that does not overlap the second counter electrode 434*b* in the width direction W.

In the example shown in FIG. 10, a pitch P1 at which the plurality of first counter electrodes 432 are arranged and a pitch P2 at which the plurality of second counter electrodes 434 are arranged are set to be the same or substantially the same length. The adjacent first counter electrode 432*a* and second counter electrode 434*a* are arranged at positions deviated from each other along the signal transmission direction S by a positional deviation amount Px. The positional deviation amount Px is set, for example, to about half the length of the pitch P1 or P2. However, the present invention is not limited to such a case, but includes a case where the positional deviation amount Px is set to any length as long as it is smaller than the pitch P1 or P2. The pitch P1 is the distance between the centers of two adjacent first counter electrodes 432, the pitch P2 is the distance between the centers of two adjacent second counter electrodes 434, and the positional deviation amount Px is the distance between the centers of adjacent first counter electrode 432 and second counter electrode 434. With respect to the length in the signal transmission direction S, the width of the individual first counter electrodes 432 and the width of the individual second counter electrodes 434 are set to the same or substantially the same length. The interval between two adjacent first counter electrodes 432 (the length of the gap) and the interval between two adjacent second counter electrodes 434 are also set to the same or substantially the same length.

With the above configuration, by arranging the first counter electrode 432 and the second counter electrode 434 at positions deviated from each other in the signal transmission direction S, capacitance formation between the first counter electrode 432 and the second counter electrode 434 can be reduced or prevented. Thus, the isolation or coupling of the first signal line 26 and the second signal line 28 can be improved.

Figure 11:
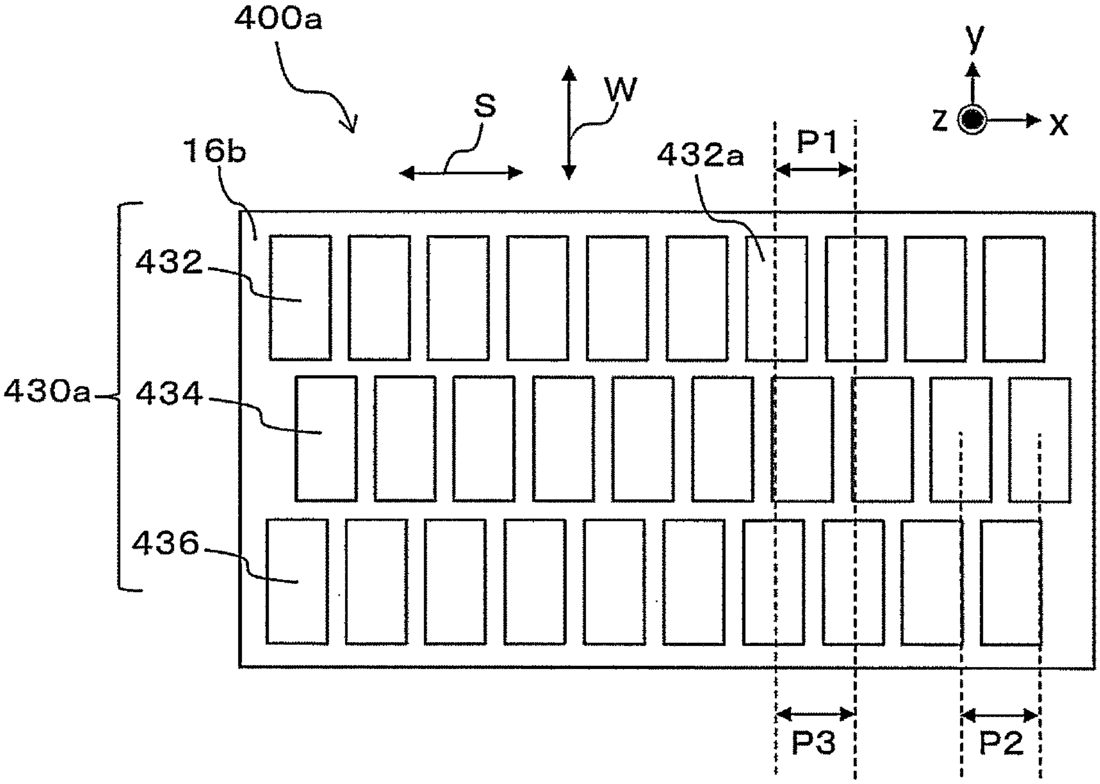
FIG. 11 is a top view showing one layer of a transmission line according to a variation of the fourth example embodiment of the present invention.

Here, FIG. 11 shows a transmission line 400*a* according to a variation of the fourth example embodiment. As shown in FIG. 11, a second conductor pattern 430*a* of the transmission line 400*a* includes a plurality of fifth counter electrodes 436, in addition to a plurality of first counter electrodes 432 and a plurality of second counter electrodes 434.

Similarly to the counter electrodes 432 and 434, the plurality of fifth counter electrodes 436 are periodically arranged at intervals along the signal transmission direction S, and are provided adjacent to the second counter electrodes 434 in the width direction W.

In the example shown in FIG. 11, a pitch P3 at which the plurality of fifth counter electrodes 436 are arranged is set to be the same or substantially the same as each of the pitches P1 and P2 of the counter electrodes 432 and 434. Further, the position of the individual fifth counter electrodes 436 in the signal transmission direction S is set to a position that is deviated from the position of the individual second counter electrodes 434 and that is the same or substantially the same position as the individual first counter electrodes 432. The pitch P3 is the distance between the centers of two adjacent fifth counter electrodes 436. With respect to the length in the signal transmission direction S, the width of the individual fifth counter electrodes 436 is set to be the same or substantially the same length as the width of the individual first counter electrodes 432 and as the width of the individual second counter electrodes 434. The interval between two adjacent fifth counter electrodes 436 (the length of the gap) is also set to the same or substantially the same length as the interval between two adjacent first counter electrodes 432 and as the interval between two adjacent second counter electrodes 434.

With the configuration shown in FIG. 11, capacitance formation between adjacent counter electrodes 432 and 434 in the width direction W can be reduced or prevented, and capacitance formation between adjacent counter electrodes 434 and 436 in the width direction W can be reduced or prevented By setting the positions of the first counter electrode 432 and the fifth counter electrode 436, which are arranged to sandwich the second counter electrode 434, to be the same or substantially the same in the signal transmission direction S, the arrangement of the counter electrodes 432, 434, and 436 can be easily determined. Even when four or more rows of counter electrodes are provided at intervals along the width direction W, the arrangement of the counter electrodes can be easily determined by arranging the adjacent counter electrodes so that they are deviated from each other in the signal transmission direction S and setting the positions of the counter electrodes of every other row to be the same in the signal transmission direction S.

Fifth Example Embodiment

A transmission line 500 according to a fifth example embodiment of the present invention is described below with reference to the drawings.

Figure 12:
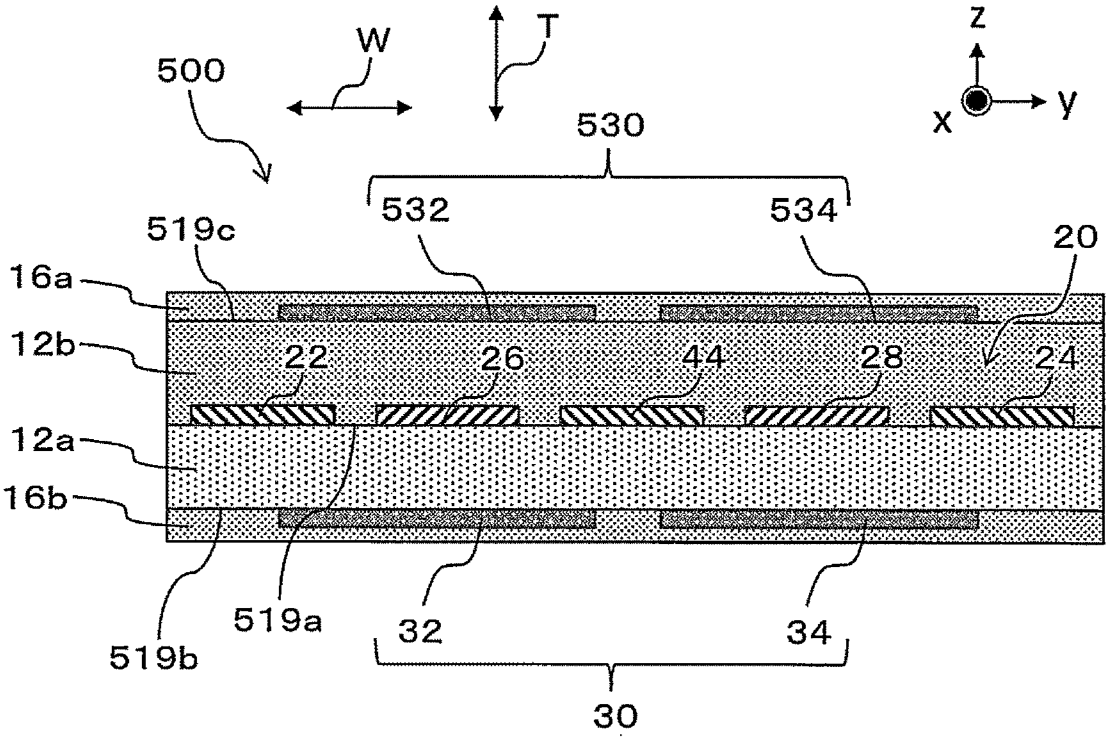
FIG. 12 is a longitudinal sectional view of a transmission line according to a fifth example embodiment of the present invention.
Figure 13A:
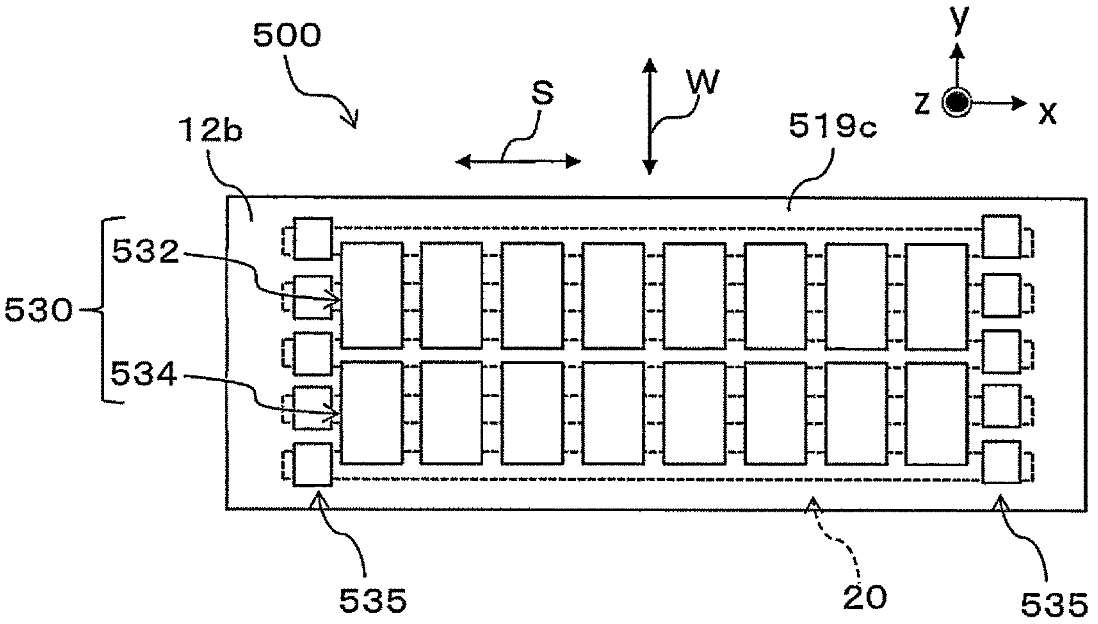
FIG. 13A is a top view showing one layer of the transmission line according to the fifth example embodiment of the present invention.
Figure 13B:
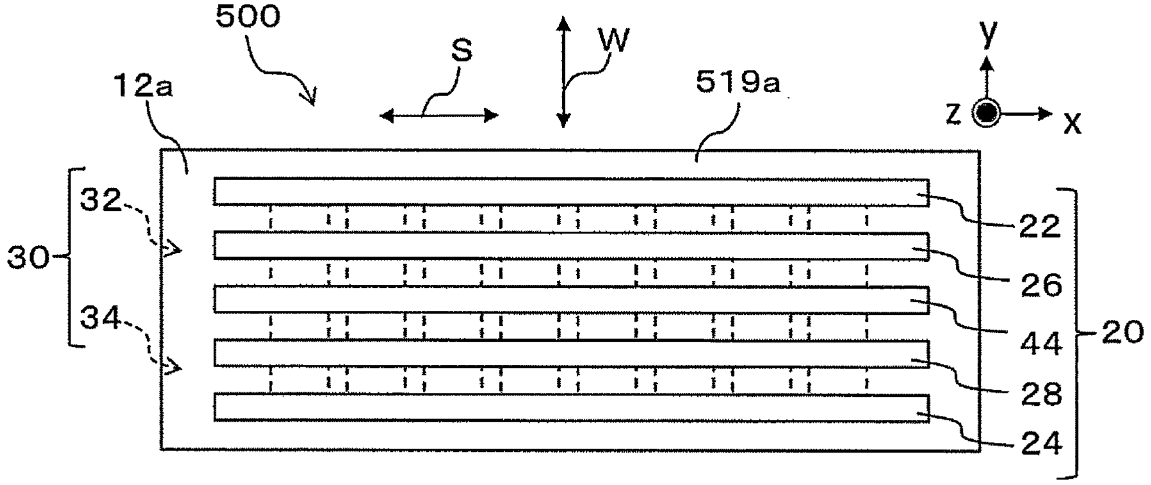
FIG. 13B is a top view of another layer of the transmission line according to the fifth example embodiment of the present invention.

FIG. 12 is a longitudinal sectional view of the transmission line 500. FIGS. 13A and 13B are top views showing respective layers of the transmission line 500.

The transmission line 500 according to the fifth example embodiment differs from the transmission line 100 according to the first example embodiment in that it includes two insulator layers 12*a* and 12*b* between protective films 16*a* and 16*b*, and it further includes, in addition to the first conductor pattern 20 and the second conductor pattern 30, a third conductor pattern 530.

As shown in FIG. 12, the two insulator layers 12*a* and 12*b* are stacked in the thickness direction T between the protective films 16*a* and 16*b*. The first conductor pattern 20 is provided on a first main surface 519*a* of the insulator layer 12*a*, and the second conductor pattern 30 is provided on a second main surface 519*b* of the insulator layer 12*a*. The third conductor pattern 530 is provided on a third main surface 519*c* of the insulator layer 12*b*.

The third conductor pattern 530 includes third counter electrodes 532 and fourth counter electrodes 534. The structure of the third conductor pattern 530 is preferably the same as or similar to that of the second conductor pattern 30. In other words, the third conductor pattern 530 is provided on the third main surface 519*c* of the insulator layer 12*b* as a conductor pattern with the same or substantially the same structure as the second conductor pattern 30. In the example shown in FIG. 13A, a plurality of lands 535 are provided to extend the first conductor pattern 20 on the layer below the third conductor pattern 530. The lands 535 are not shown in the longitudinal sectional view of FIG. 12, and the lands are not shown and described in the subsequent example embodiments.

As shown in FIG. 13A, the plurality of third counter electrodes 532 are periodically arranged at intervals along the signal transmission direction S. Similarly, the plurality of fourth counter electrodes 534 are periodically arranged at intervals along the signal transmission direction S.

When viewed in the thickness direction T, the plurality of third counter electrodes 532 overlap a first ground conductor 22, a first signal line 26, and a third ground conductor 44 of the first conductor pattern 20 indicated by the solid line in FIG. 13B. Similarly, when viewed in the thickness direction T, the plurality of fourth counter electrodes 534 overlap the third ground conductor 44, a second signal line 28, and a second ground conductor 24 of the first conductor pattern 20 indicated by the solid lines in FIG. 13B.

The individual third counter electrodes 532 overlap, in the thickness direction T, individual first counter electrodes 32 indicated by the dotted line in FIG. 13B. The individual fourth counter electrodes 534 overlap, in the thickness direction T, individual second counter electrodes 34 indicated by the dotted line in FIG. 13B.

As shown in FIG. 12, the first signal line 26 is sandwiched in the thickness direction T by the first counter electrode 32 and the third counter electrode 532, and the second signal line 28 is sandwiched in the thickness direction T by the second counter electrode 34 and the fourth counter electrode 534.

With the above configuration, the shielding performance against unwanted radiation can be improved by providing the third counter electrode 532 and the fourth counter electrode 534 in addition to the first counter electrode 32 and the second counter electrode 34. Thus, the isolation or coupling of the first signal line 26 and the second signal line 28 can be improved.

The third counter electrodes 532 and the fourth counter electrode 534 may be floating conductors or ground conductors. The present invention also includes a case where one of the first counter electrode 32 and the third counter electrode 532, which overlap each other in the thickness direction T, is omitted and only the other is provided. Similarly, the present invention also includes a case where one of the second counter electrode 34 and the fourth counter electrode 534, which overlap each other in the thickness direction T, is omitted and only the other is provided.

Sixth Example Embodiment

A transmission line 600 according to a sixth example embodiment is described below with reference to the drawings.

Figure 14:
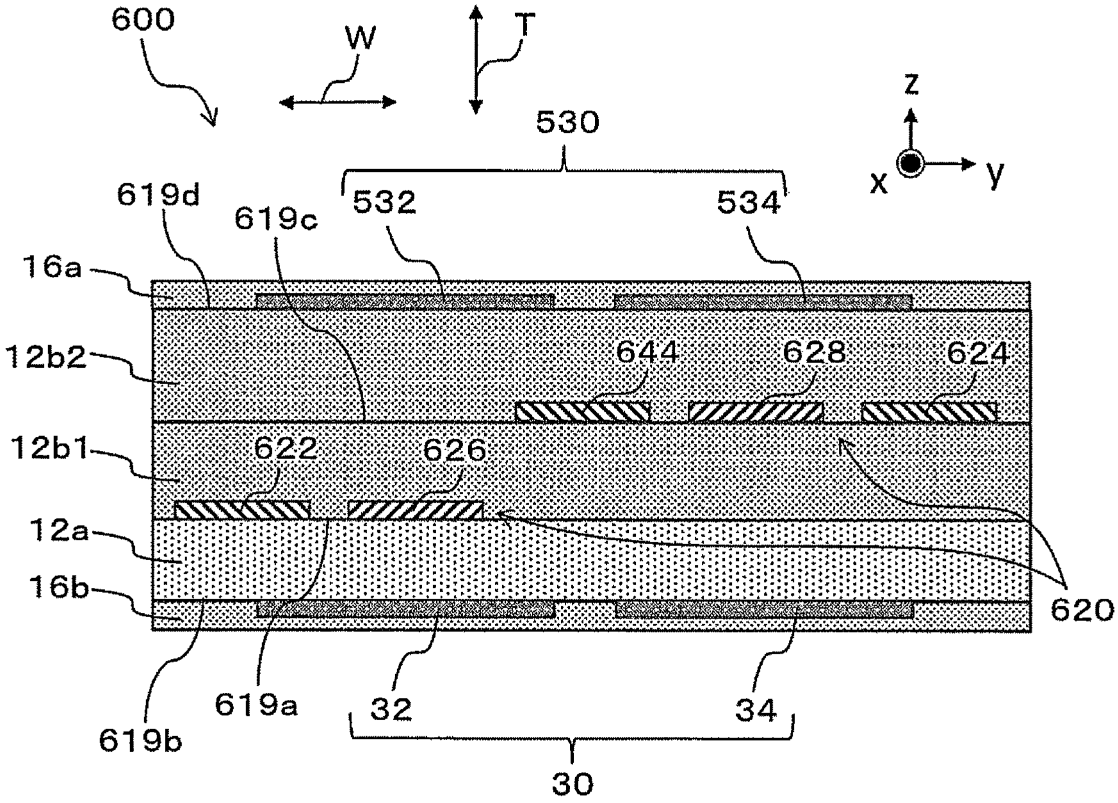
FIG. 14 is a longitudinal sectional view of a transmission line according to a sixth example embodiment of the present invention.

FIG. 14 is a longitudinal sectional view of the transmission line 600.

The transmission line 600 according to the sixth example embodiment preferably differs from the transmission line 500 according to the fifth example embodiment in that the insulator layer 12*b* is divided into two insulator layers 12*b*1 and 12*b*2 and a first conductor pattern 620 is provided in each of the layers.

As shown in FIG. 14, the two insulator layers 12*b*1 and 12*b*2 are stacked in the thickness direction T. The insulator layer 12*b*1 is stacked on top of the insulator layer 12*a*, the insulator layer 12*b*2 is stacked on top of the insulator layer 12*b*1, and a protective film 16*a* is stacked on top of the insulator layer 12*b*2.

The first conductor pattern 620 preferably includes a first ground conductor 622, a first signal line 626, a third ground conductor 644, a second signal line 628, and a second ground conductor 624.

In the example shown in FIG. 14, of the first conductor pattern 620, the first ground conductor 622 and the first signal line 626 are provided on the same layer, and the third ground conductor 644, the second signal line 628, and the second ground conductor 624 are provided on the same layer.

As shown in FIG. 14, the first ground conductor 622 and the first signal line 626 are provided on a first main surface 619*a* of an insulator layer 12*a*, and a second conductor pattern 30 is provided on a second main surface 619*b* of the insulator layer 12*a*. Similarly, the third ground conductor 644, the second signal line 628, and the second ground conductor 624 are provided on a third main surface 619*c* of the insulator layer 12*b*2, and a third conductor pattern 530 is provided on a fourth main surface 619*d* of the insulator layer 12*b*2.

Similarly to the transmission line 500 of the fifth example embodiment, the first counter electrode 32 and the third counter electrode 532 overlap the first ground conductor 622, the first signal line 626, and the third ground conductor 644 when viewed in the thickness direction T. The second counter electrode 34 and the fourth counter electrode 534 overlap the third ground conductor 644, the second signal line 628, and the second ground conductor 624 when viewed in the thickness direction T.

With the configuration shown in FIG. 14, the first signal line 626 and the second signal line 628, which define the first conductor pattern 620, are arranged in different layers, so that the distance between the first signal line 626 and the second signal line 628 become large, so that direct interference can be reduce or prevent Further, the first signal line 626 is far away from the third counter electrode 532 provided on the upper side thereof, and the second signal line 628 is far away from the second counter electrode 34 provided on the lower side thereof. Thus, interference via the counter electrodes 32, 34, 532, and 534 can also be reduced or prevented, and the isolation or coupling of the first signal line 26 and the second signal line 28 can be improved.

Figure 15:
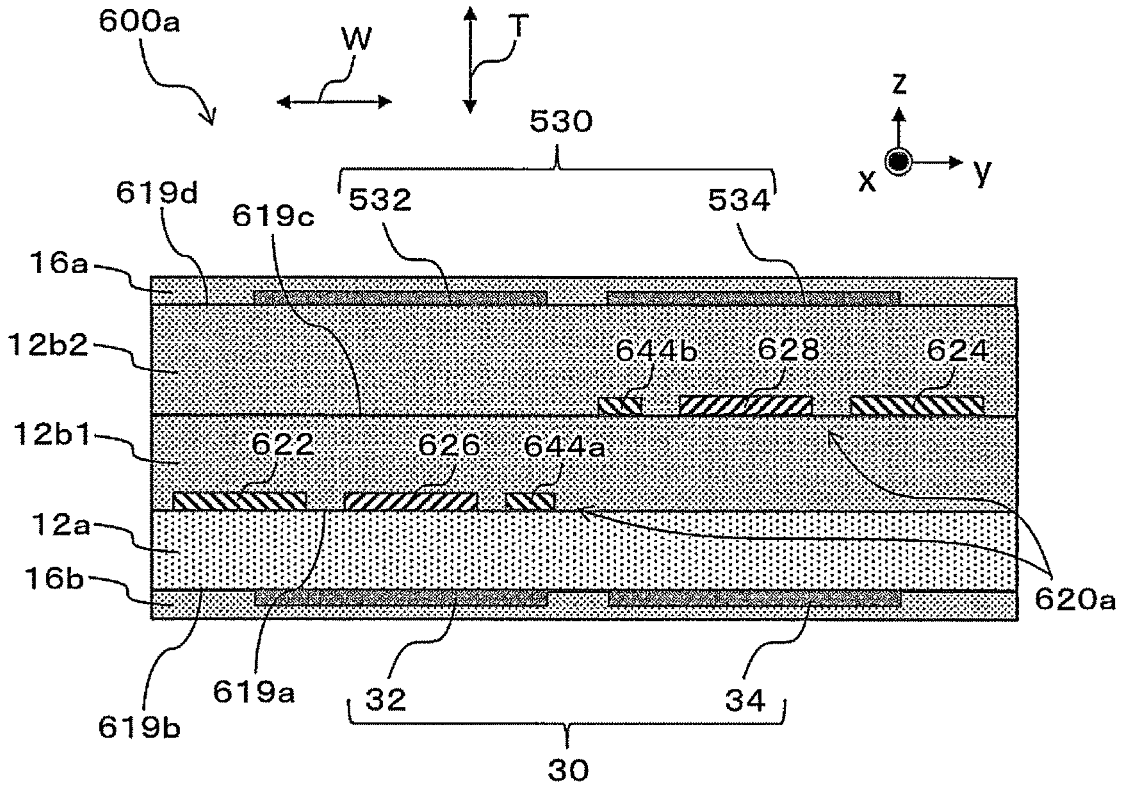
FIG. 15 is a longitudinal sectional view of a transmission line according to a variation of the sixth example embodiment of the present invention.

Here, FIG. 15 shows a transmission line 600*a* according to a variation of the sixth example embodiment. As shown in FIG. 15, a first conductor pattern 620*a* of the transmission line 600*a* has two third ground conductors 644*a* and 644*b*.

As shown in FIG. 15, the third ground conductors 644*a* and 644*b* are provided in different layers. The third ground conductor 644*a* is preferably provided on the same layer as a first ground conductor 622 and a first signal line 626, i.e., on a first main surface 619*a* of an insulator layer 12*a*. The third ground conductor 644*b* is preferably provided on the same layer as a second signal line 628 and a second ground conductor 624, i.e., on a third main surface 619*c* of an insulator layer 12*b*2.

With the structure shown in FIG. 15, the isolation or coupling of the first signal line 626 and the second signal line 628 can be further improved by dividing the ground conductor into the two third ground conductors 644*a* and 644*b* and arranging the third ground conductors 644*a* and 644*b* in different layers.

Seventh Example Embodiment

A transmission line 700 according to a seventh example embodiment is described below with reference to the drawings.

Figure 16:
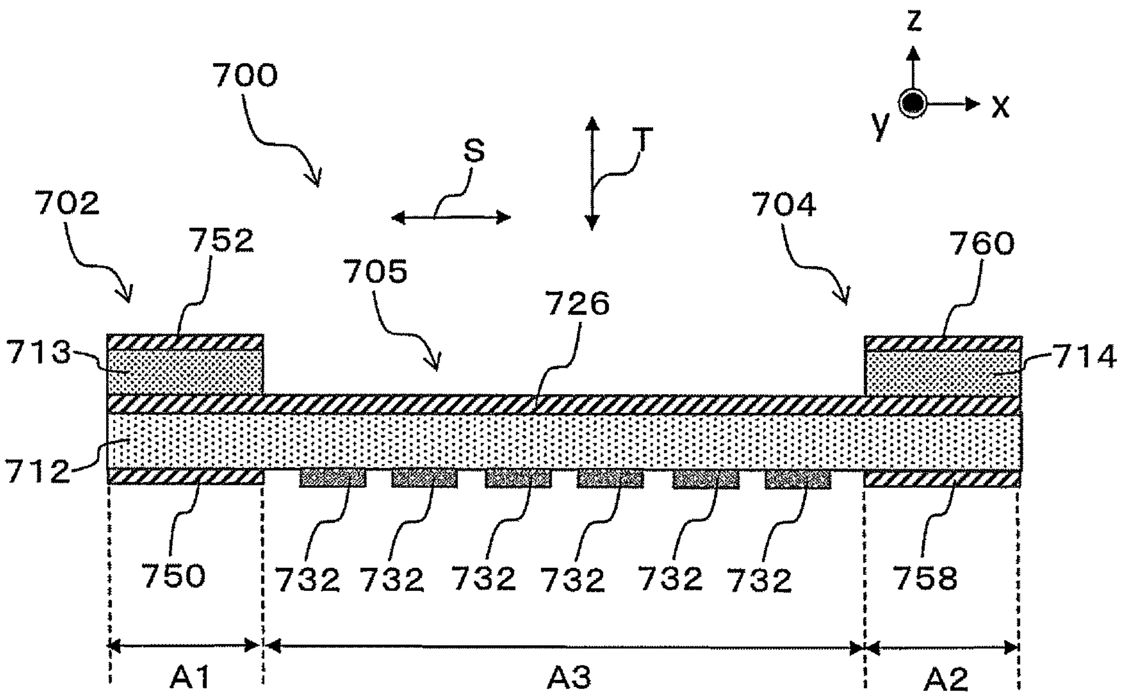
FIG. 16 is a longitudinal sectional view of a transmission line according to a seventh example embodiment of the present invention.
Figure 17:
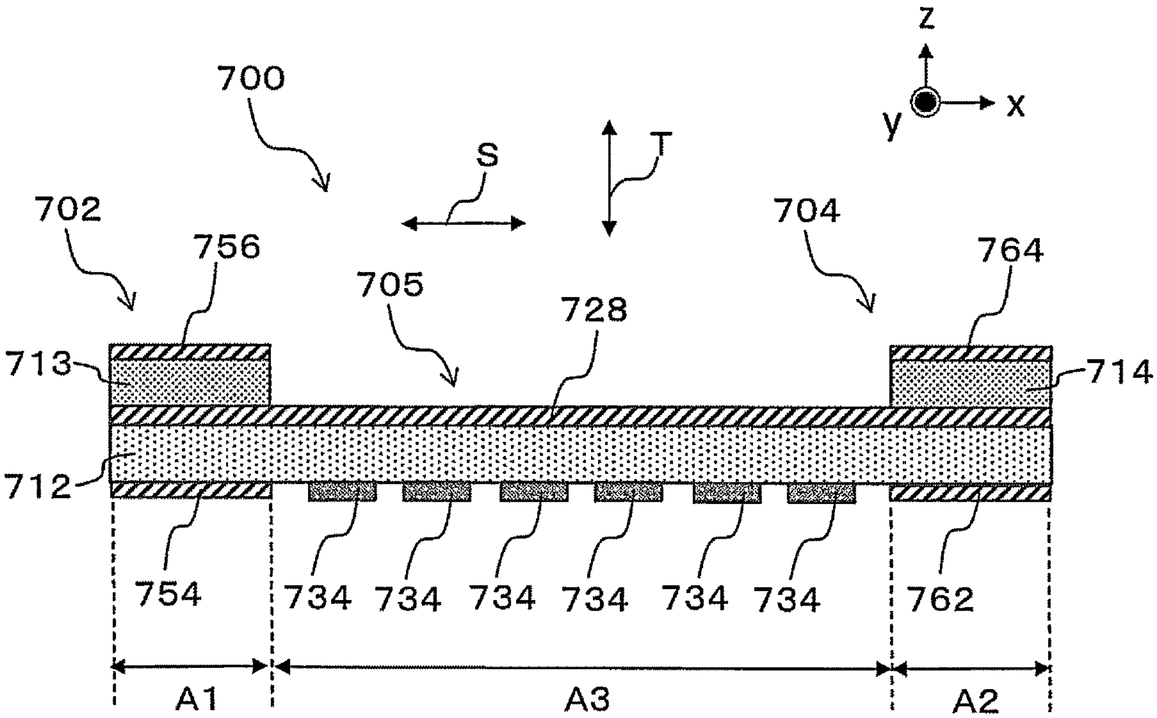
FIG. 17 is a longitudinal sectional view of the transmission line according to the seventh example embodiment of the present invention.

FIGS. 16 and 17 are each a longitudinal sectional view of the transmission line 700. FIGS. 16 and 17 show a partially simplified structure in which, for example, protective films 16*a* and 16*b* are omitted.

The transmission line 700 according to the seventh example embodiment preferably differs from the transmission line 100 according to the first example embodiment in that it includes a strip line structure.

As shown in FIG. 16, a first signal line 726 is preferably provided on one main surface of an insulator layer 712, and a plurality of first counter electrodes 732 are provided on the other main surface. The plurality of first counter electrodes 732 are periodically arranged at intervals along the signal transmission direction S and face the first signal line 726 when viewed in the thickness direction T.

As shown in FIG. 17, a second signal line 728 is provided on one main surface of the insulator layer 712, and a plurality of second counter electrodes 734 are provided on the other main surface. The plurality of second counter electrodes 734 are periodically arranged at intervals along the signal transmission direction S and face the second signal line 728 when viewed in the thickness direction T.

The second signal line 728 and the second counter electrode 734 shown in FIG. 17 are arranged at positions deviated from the first signal line 726 and the first counter electrode 732 shown in FIG. 16 in the width direction W. When viewed in the thickness direction, the plurality of first counter electrodes 732 overlap the first signal line 726 but do not overlap the second signal line 728 shown in FIG. 17. When viewed in the thickness direction T, the plurality of second counter electrodes 734 overlap the second signal line 728 but do not overlap the first signal line 726 shown in FIG. 16.

As shown in FIG. 16, a strip line structure 702 and a strip line structure 704 are provided at respective ones of two end portions of the transmission line 700 in the signal transmission direction S.

The strip line structure 702 preferably includes a pair of ground conductors 750 and 752 (FIG. 16) at positions sandwiching the aforesaid first signal line 726 in the thickness direction T, and further includes a pair of ground conductors 754 and 756 (FIG. 17) at positions sandwiching the second signal line 728 in the thickness direction T. The ground conductors 750 and 754 are provided on the lower main surface of the insulator layer 712, and the ground conductors 752 and 756 are provided on the upper main surface of an insulator layer 713. The ground conductors 750 and 754 are provided on the same layer as the first counter electrode 732 and the second counter electrode 734.

The strip line structure 704 preferably includes a pair of ground conductors 758 and 760 (FIG. 16) at positions sandwiching the aforesaid first signal line 726 in the thickness direction T, and further includes a pair of ground conductors 762 and 764 (FIG. 17) at positions sandwiching the second signal line 728 in the thickness direction T. The ground conductors 758 and 762 are provided on the lower main surface of the insulator layer 712, and the ground conductors 760 and 764 are provided on the upper main surface of an insulator layer 714. The ground conductors 758 and 762 are provided on the same layer as the first counter electrode 732 and the second counter electrode 734.

The transmission line 700 preferably includes three sections which are: a first section A1, a second section A2, and a third section A3. The first section A1 is a section where the strip line structure 702 is provided, the second section A2 is a section where the strip line structure 704 is provided, and the third section A3 is a section between the first section A1 and the second section A2. In the third section A3, the first signal line 726 and second signal line 728 and the first counter electrode 732 and second counter electrode 734 are arranged to sandwich the insulator layer 712 therebetween in the thickness direction T. Thus, a microstrip line structure 705 is provided in the third section A3.

In the third section A3, the plurality of first counter electrodes 732 and second counter electrodes 734 are arranged at intervals along the signal transmission direction S; and a portion of the transmission line 700 in the third section A3 is thinner than portions in the first section A1 and the second section A2. Thus, the portion of the transmission line 700 in the third section A3 becomes easy to bend in the thickness direction T, so that the transmission line 700 as a multilayer substrate has high flexibility. In particular, compared to a case where the counter electrodes 732 and 734 are defined by a single conductor extending in the signal transmission direction S, the stress on the second conductor pattern can be reduced, and the flexibility in the third section A3 can be achieved.

The case where the strip line structures 702 and 704 are provided on respective sides of the transmission line 700 has been described; however, the present invention is not limited to such a case but includes a case where one of the two strip line structures 702 and 704 is omitted and only the other is provided.

The case where the first signal line 726 and the second signal line 728 are each a single line extending in the signal transmission direction S has been described; however, the present invention is not limited to such a case but includes a case where each signal line has a structure in which two or more lines arranged in different layers are connected via interlayer connecting conductors such as via conductors.

Figure 18:
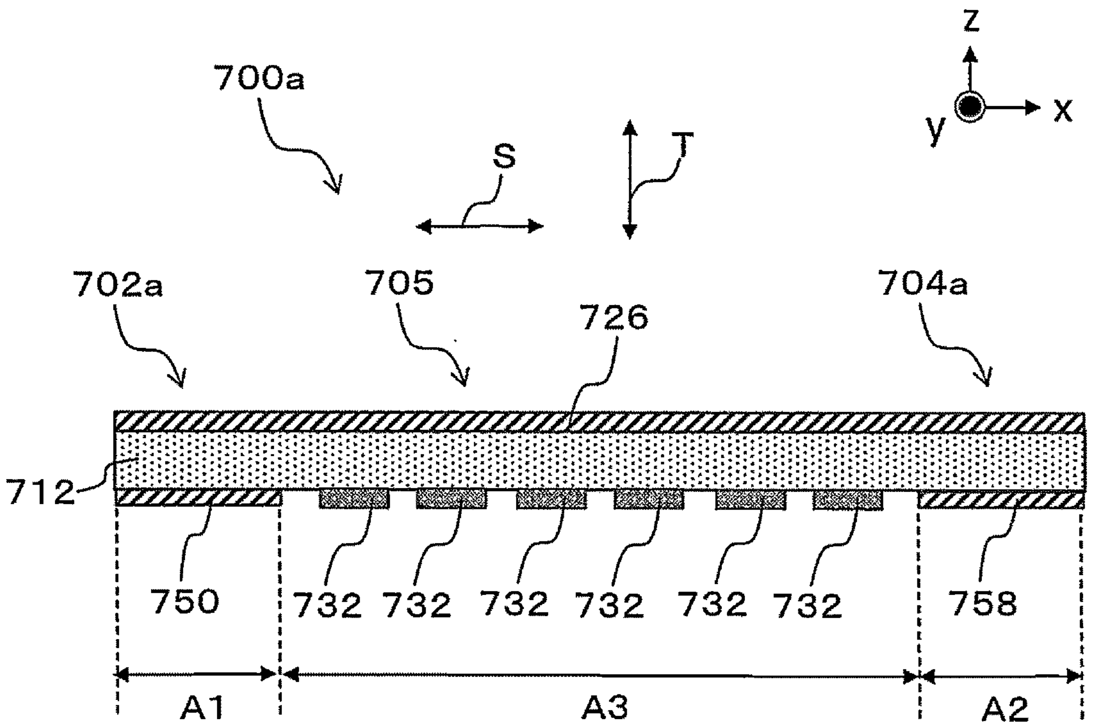
FIG. 18 is a longitudinal sectional view of a transmission line according to a variation of the seventh example embodiment of the present invention.
Figure 19:
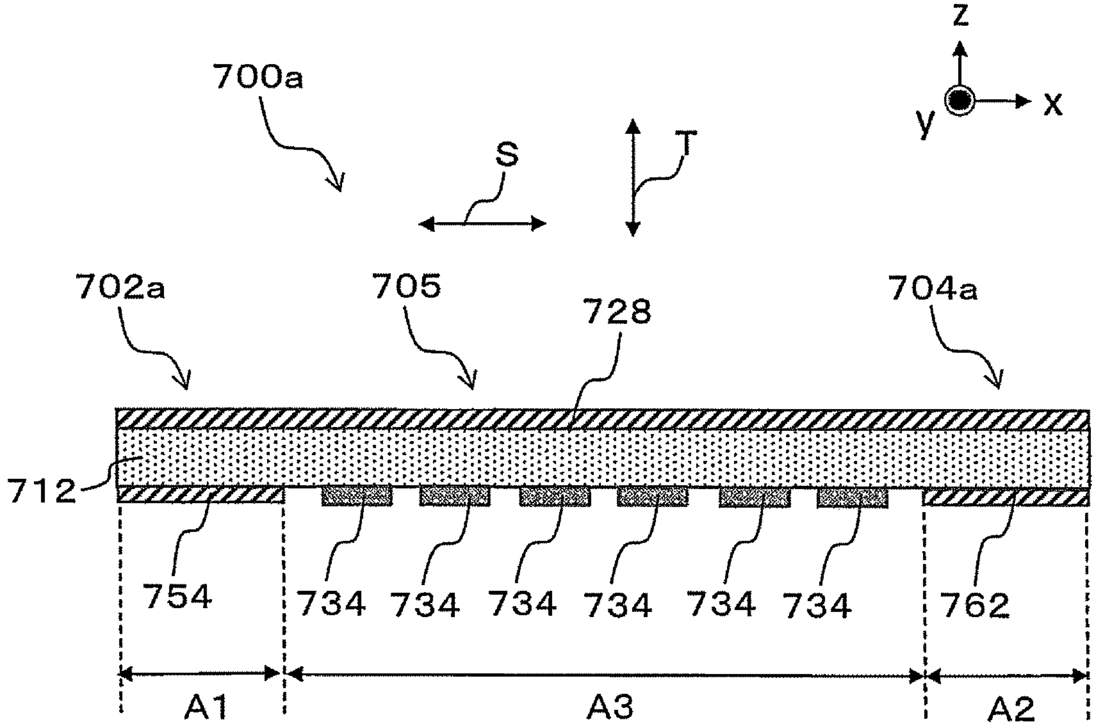
FIG. 19 is a longitudinal sectional view of the transmission line according to the variation of the seventh example embodiment of the present invention.

Here, FIG. 18 and FIG. 19 show a transmission line 700*a* according to a variation of the seventh example embodiment. FIGS. 18 and 19 are each a longitudinal sectional view of the transmission line 700*a*.

The transmission line 700*a* shown in FIGS. 18 and 19 corresponds to a configuration obtained by removing the insulator layers 713 and 714 and the ground conductors 752 and 760 of the transmission line 700 shown in FIGS. 16 and 17.

In the transmission line 700*a*, a series of microstrip line structures are formed in sections A1 to A3. In the first section A1, a microstrip line structure 702*a* is formed; in the second section A2, a microstrip line structure 704*a* is formed; and in the third section A3, a microstrip line structure 705 is formed.

In the example shown in FIGS. 18 and 19, the microstrip line structures 702*a* and 704*a* are provided on respective sides of the transmission line 700*a*; however, the present invention is not limited to such a case but includes a case where one of the two microstrip line structures 702*a* and 704*a* is omitted and only the other is provided.

In other words, in the transmission lines 700 and 700*a*, at least one or the other side of the first counter electrode 732 and the second counter electrode 734 may have a strip line structure or microstrip line structure in the extension direction of the signal lines 726 and 728 (the signal transmission direction S). Thus, the transmission lines 700 and 700*a* with high flexibility can be achieved.

Eighth Example Embodiment

A transmission line 800 according to an eighth example embodiment is described below with reference to the drawings.

Figure 22:
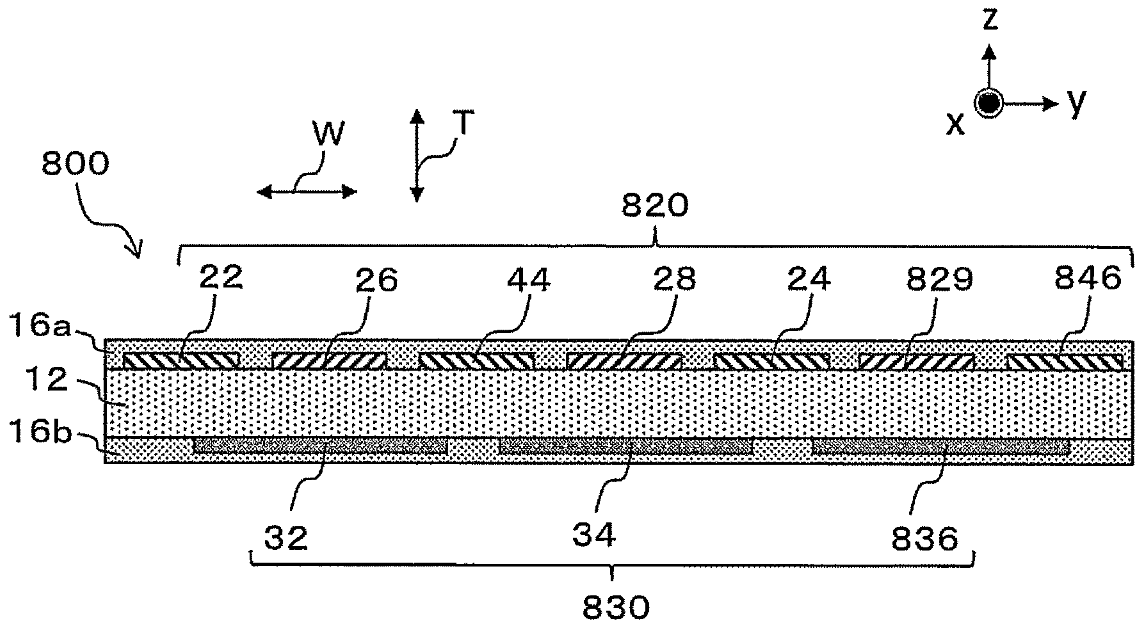
FIG. 22 is a longitudinal sectional view of a transmission line according to an eighth example embodiment of the present invention.
Figure 23:
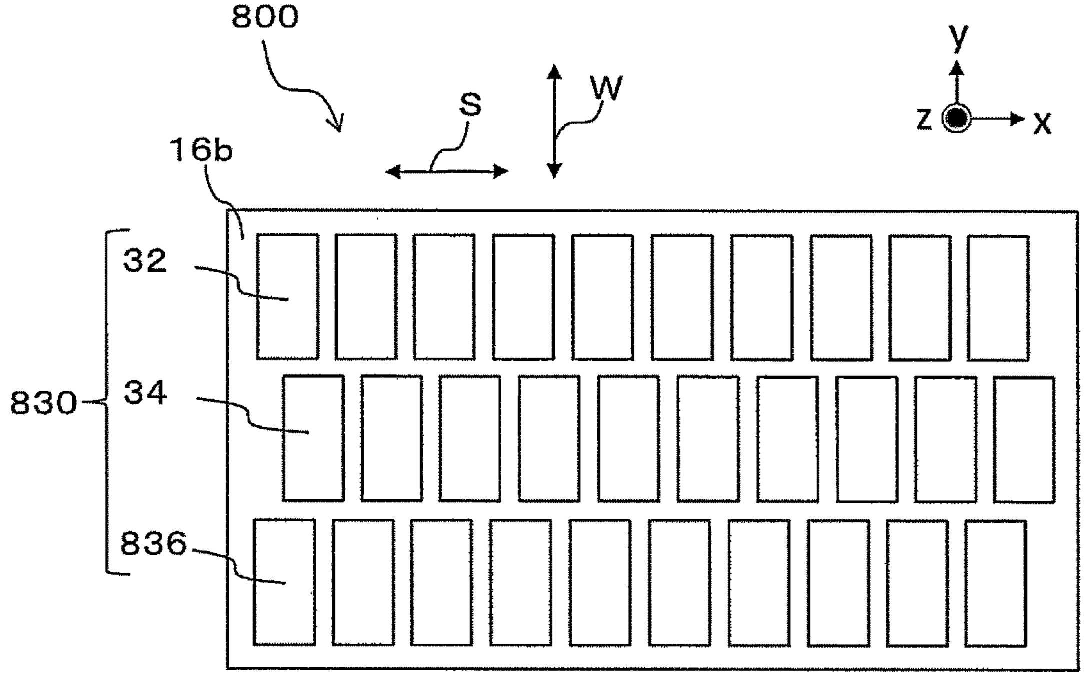
FIG. 23 is a top view showing one layer of the transmission line according to the eighth example embodiment of the present invention.

FIG. 22 is a longitudinal sectional view of the transmission line 800, and FIG. 23 is a top view showing one layer of the transmission line 800.

The transmission line 800 according to the eighth example embodiment differs from the transmission line 100 according to the first example embodiment in that it is provide with one more signal line, one more ground conductor, and one more counter electrode (floating electrode).

As shown in FIG. 22, the transmission line 800 preferably includes a first conductor pattern 820 and a second conductor pattern 830.

The first conductor pattern 820 preferably further includes a signal line 829 in addition to two signal lines 26 and 28, and a ground conductor 846 in addition to three ground conductors 22, 44, and 24.

The second conductor pattern 830 preferably further includes a counter electrode 836 in addition to two counter electrodes 32 and 34.

The signal line 829 is sandwiched in the width direction W by two ground conductors 24 and 846. The counter electrode 836 overlaps one signal line 829 and two ground conductors 24 and 846 when viewed in the thickness direction T.

With such a configuration, the number of the signal lines is increased to three, which are the signal lines 26, 28, and 829, and isolation can be improved by the ground conductors 22, 44, 24, and 846 and the counter electrodes 32, 34, and 836 (floating electrodes).

As shown in FIG. 23, the arrangement of the three counter electrodes 32, 34, and 836 of the second conductor pattern 830 may be similar to the arrangement of the transmission line 400*a* according to the variation of the fourth example embodiment shown in FIG. 11. Specifically, the counter electrodes 32 and 34 adjacent to each other in the width direction W are arranged at positions deviated from each other in the signal transmission direction S, and the counter electrodes 34 and 836 adjacent to each other in the width direction W are arranged at positions deviated from each other in the signal transmission direction S. Thus, the capacitance formation between the counter electrodes 32, 34, and 836 can be reduced or prevented.

Ninth Example Embodiment

A transmission line 900 according to a ninth example embodiment is described below with reference to the drawings.

Figure 24:
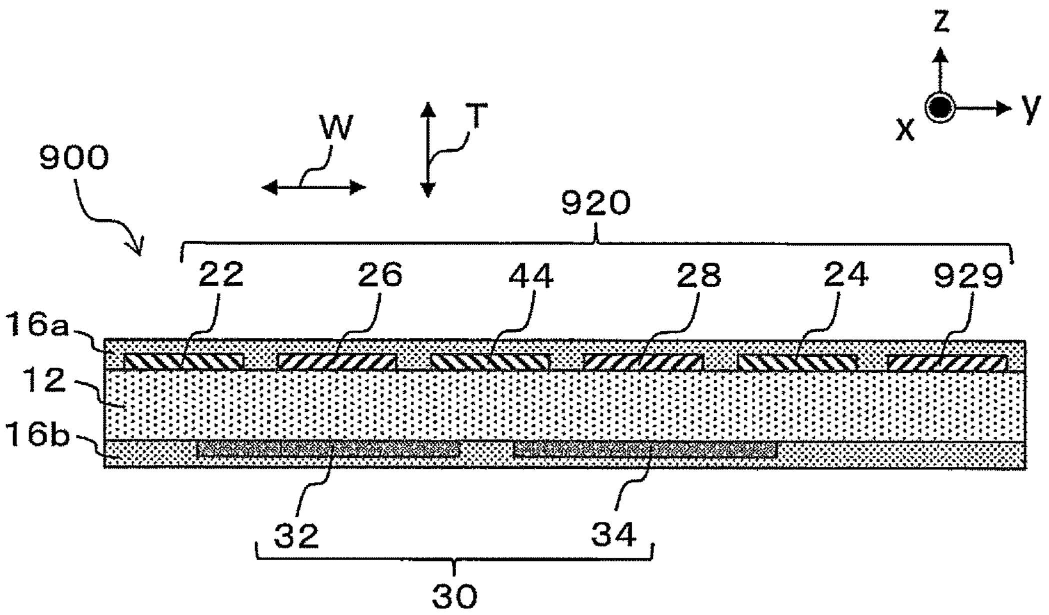
FIG. 24 is a longitudinal sectional view of a transmission line according to a ninth example embodiment of the present invention.

FIG. 24 is a longitudinal sectional view of the transmission line 900.

The transmission line 900 according to the ninth example embodiment preferably differs from the transmission line 800 according to the eighth example embodiment in that it does not have the ground conductor 846 and the counter electrode 836.

As shown in FIG. 24, the transmission line 900 preferably includes a first conductor pattern 920, and the first conductor pattern 920 preferably includes a signal line 929. The signal line 929 does not overlap any of counter electrodes 32 and 34 when viewed in the thickness direction T.

The present invention is not limited to the case where all signal lines overlap the counter electrodes (floating electrodes) in the thickness direction T, as in the transmission line 800 according to the eighth example embodiment, but includes a case where some of signal lines (i.e., the signal lines 26 and 28) overlap the counter electrodes 32 and 34 in the thickness direction T and one of the signal lines (i.e., the signal line 929) does not overlap the counter electrodes 32 and 34 in the thickness direction T, as in the transmission line 900 according to the ninth example embodiment.

Tenth Example Embodiment

A transmission line 1000 according to a tenth example embodiment will be described below with reference to the drawings.

Figure 25:
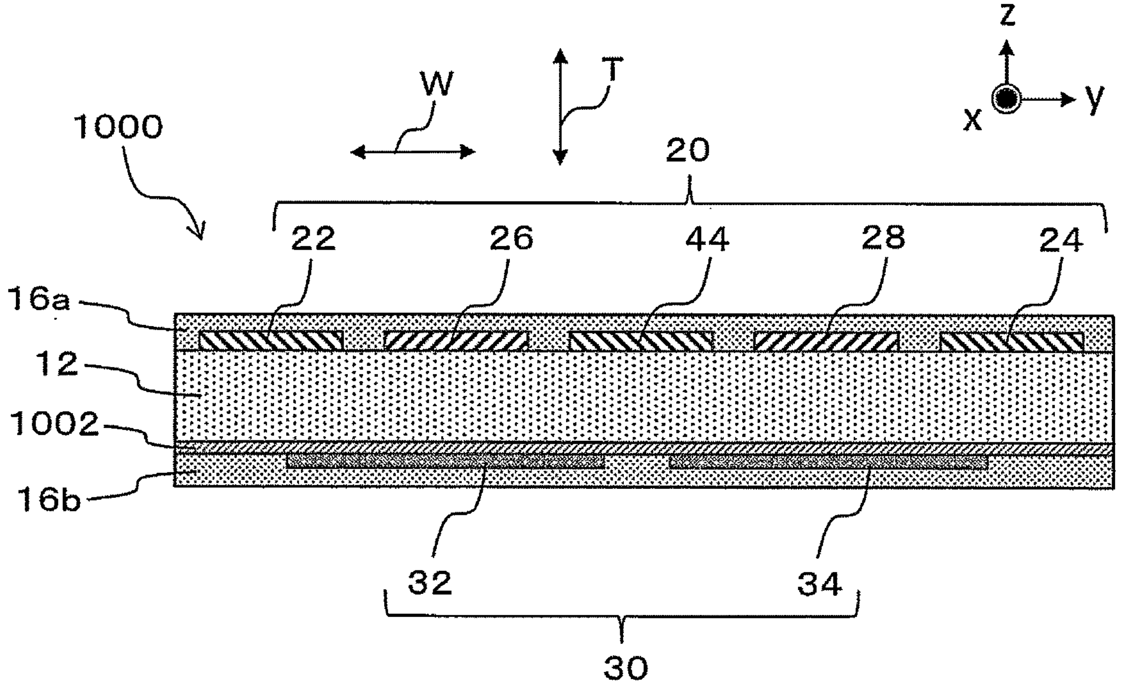
FIG. 25 is a longitudinal sectional view of a transmission line according to a tenth example embodiment of the present invention.

FIG. 25 is a longitudinal sectional view of the transmission line 1000.

The transmission line 1000 according to the tenth example embodiment preferably differs from the transmission line 100 according to the first example embodiment in that it is a laminated structure using an adhesive 1002.

As shown in FIG. 25, the transmission line 1000 preferably includes the adhesive 1002. The adhesive 1002 is provided between an insulator layer 12 and a protective film 16*b* to bond the insulator layer 12 and the protective film 16*b* to each other. Such a configuration may be used to bond copper foil using the adhesive 1002.

Variation of Tenth Example Embodiment

Figure 26:
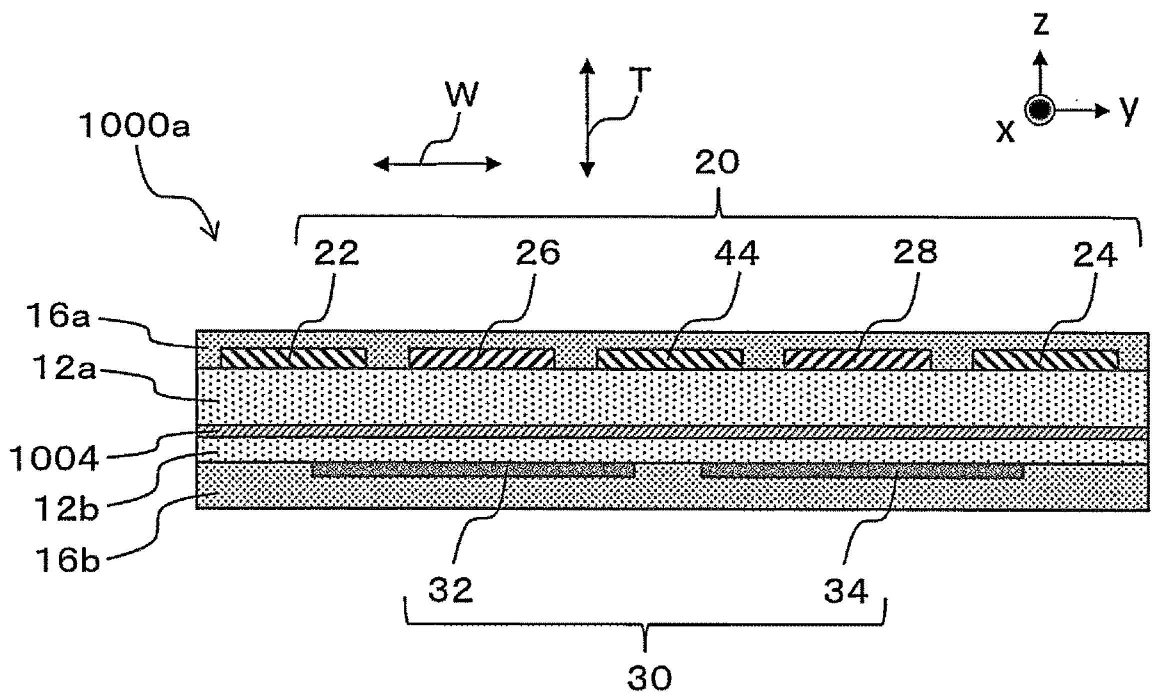
FIG. 26 is a longitudinal sectional view of a transmission line according to a variation of the tenth example embodiment of the present invention.

FIG. 26 is a longitudinal sectional view of a transmission line 1000*a* according to a variation of the tenth example embodiment.

The transmission line 1000*a* shown in FIG. 26 preferably includes a laminated structure using an adhesive 1004, and the adhesive 1004 bonds a first insulator layer 12*a* and a second insulator layer 12*b* to each other. Such a configuration may be used to laminate single-sided copper cladding with the adhesive 1004.

Eleventh Example Embodiment

A transmission line 1100 according to an eleventh example embodiment is described below with reference to the drawings.

Figure 27:
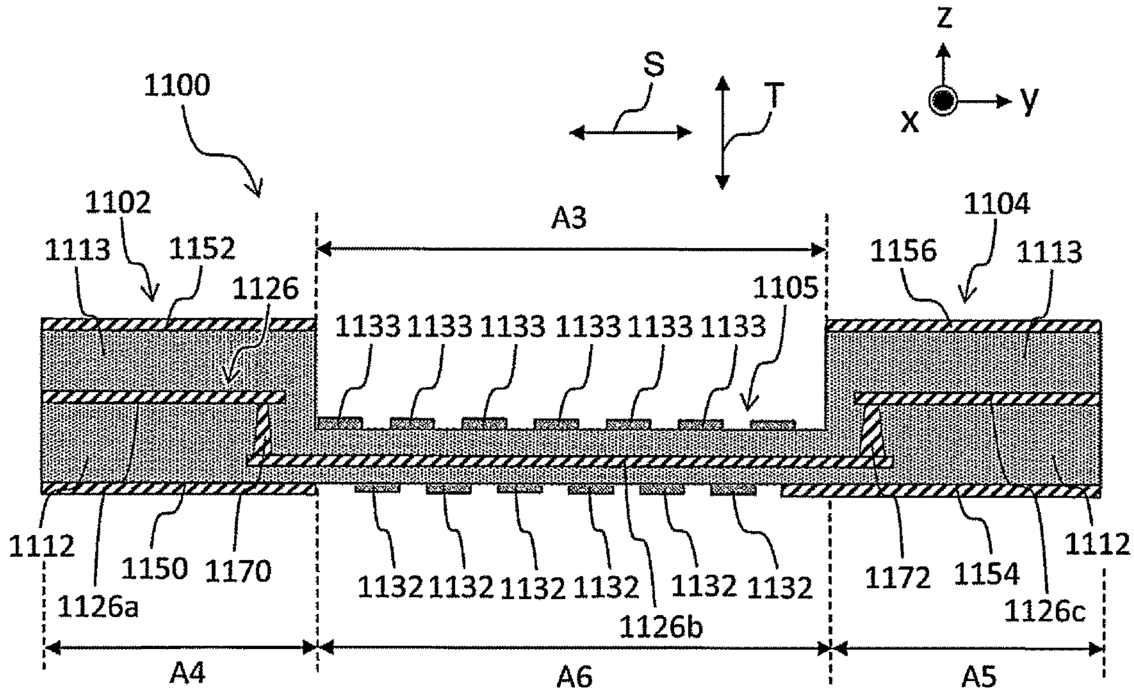
FIG. 27 is a longitudinal sectional view of a transmission line (in an unbent state) according to an eleventh example embodiment of the present invention.
Figure 28:
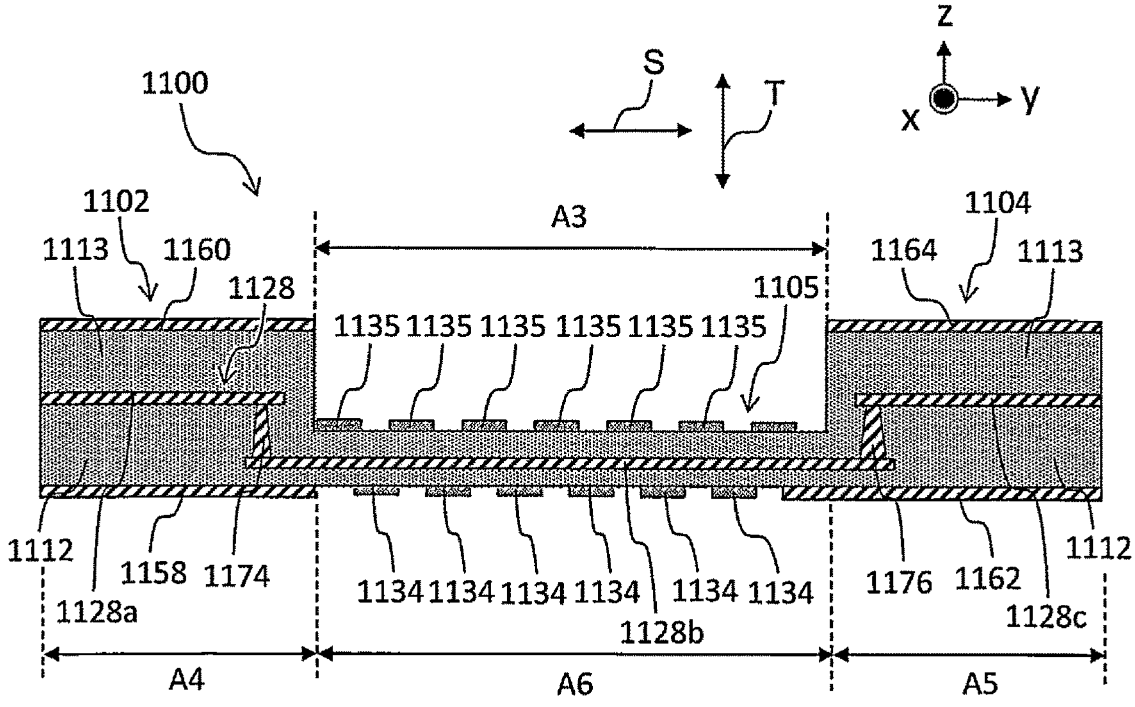
FIG. 28 is a longitudinal sectional view of the transmission line (in an unbent state) according to the eleventh example embodiment of the present invention.
Figure 29:
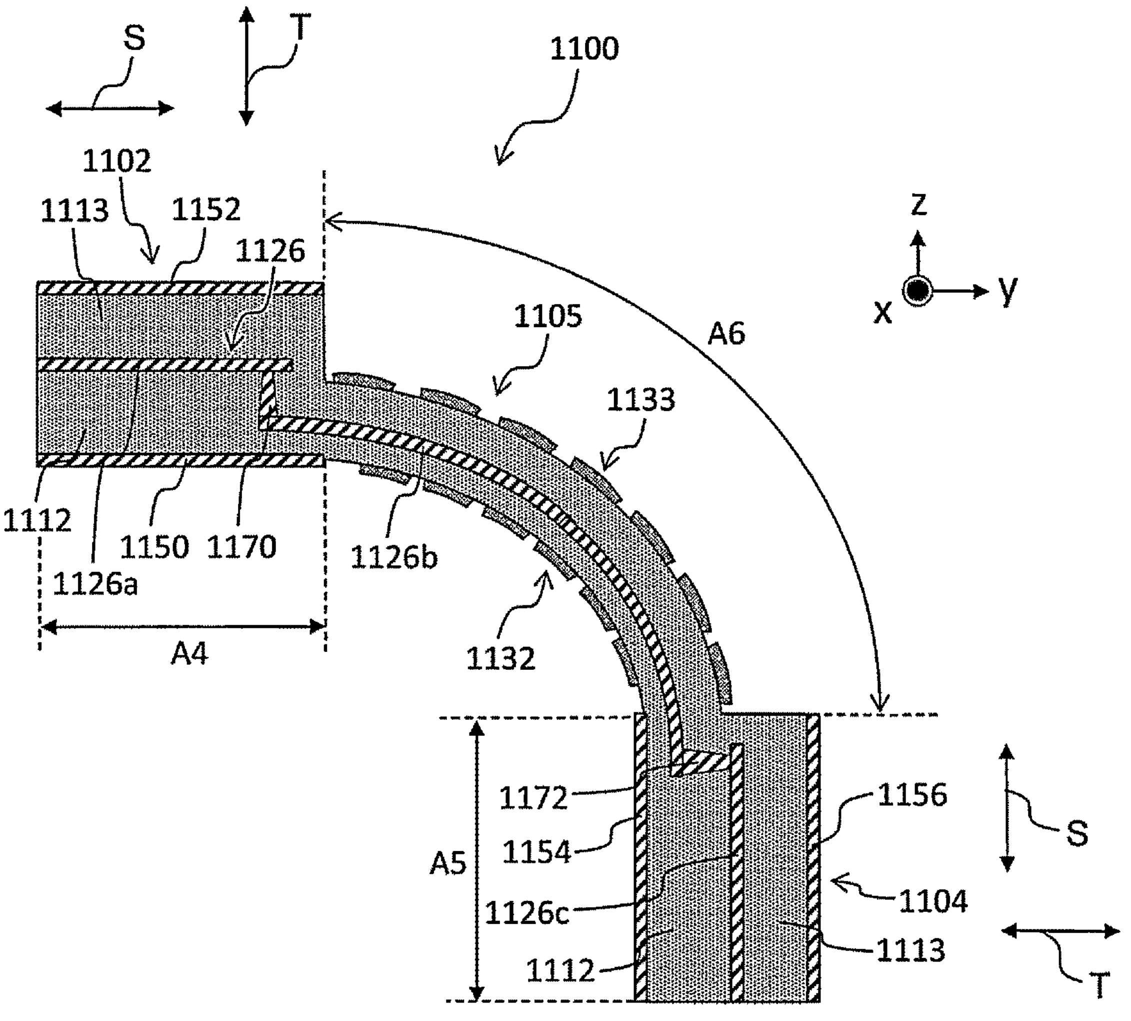
FIG. 29 is a longitudinal sectional view of the transmission line (in a bent state) according to the eleventh example embodiment of the present invention.
Figure 30:
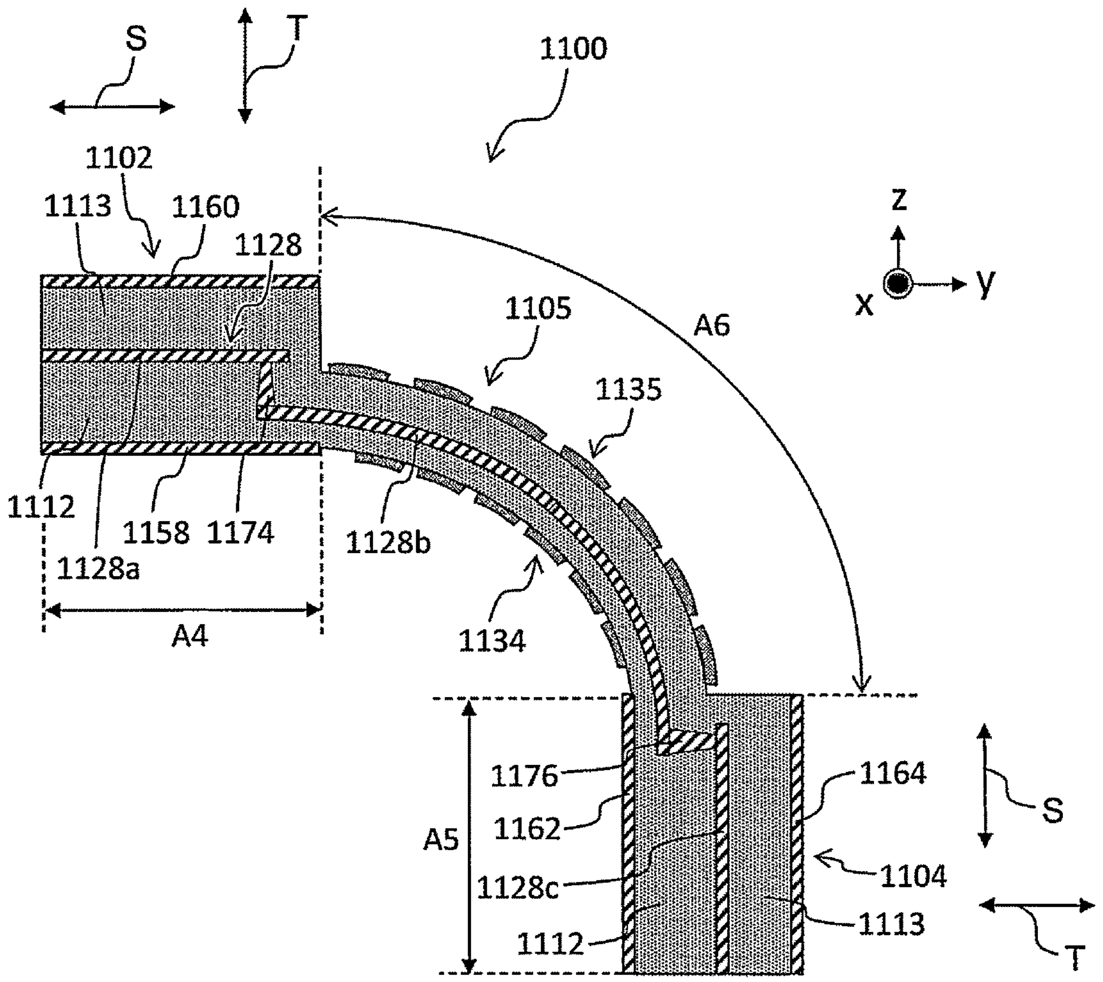
FIG. 30 is a longitudinal sectional view of the transmission line (in a bent state) according to the eleventh example embodiment of the present invention.

FIGS. 27, 28, 29, and 30 are each a longitudinal sectional view of the transmission line 1100. FIGS. 27 and 28 show the transmission line 1100 in an unbent state, and FIGS. 29 and 30 show the transmission line 1100 in a bent state.

The transmission line 1100 according to the eleventh example embodiment preferably differs from the transmission line 700 according to the seventh example embodiment in that it includes counter electrodes 1132, 1133, 1134 and 1135 (floating electrodes) provided below and above signal lines 1126 and 1128, respectively.

As shown in FIG. 27, first signal lines 1126*a*, 1126*b*, and 1126*c*, as the first signal line 1126, are preferably provided on one main surface of an insulator layer 1112. A plurality of first counter electrodes 1132 and ground conductors 1150 and 1154 are preferably provided on the other main surface of the insulator layer 1112.

The first signal lines 1126*a* and 1126*b* are located at positions different from each other in the thickness direction T and are connected via a via conductor 1170. The first signal lines 1126*b* and 1126*c* are located at positions different from each other in the thickness direction T and are connected via a via conductor 1172.

The first signal line 1126 is provided on one main surface of an insulator layer 1113. A plurality of sixth counter electrodes 1133 and ground conductors 1152 and 1156 are provided on the other main surface of the insulator layer 1113.

As shown in FIG. 28, second signal lines 1128*a*, 1128*b* and 1128*c*, as the second signal line 1128, are provided on one main surface of the insulator layer 1112. A plurality of second counter electrodes 1134 and ground conductors 1158 and 1162 are provided on the other main surface of the insulator layer 1112.

The second signal lines 1128*a* and 1128*b* are located at positions different from each other in the thickness direction T and are connected via a via conductor 1174. The second signal lines 1128*b* and 1128*c* are located at positions different from each other in the thickness direction T and are connected via a via conductor 1176.

The second signal line 1128 is provided on one main surface of the insulator layer 1113. A plurality of seventh counter electrodes 1135 and ground conductors 1160 and 1164 are provided on the other main surface of the insulator layer 1113.

The first signal line 1126, the first counter electrodes 1132, and the sixth counter electrodes 1133 shown in FIG. 27 are arranged at positions deviated, in the width direction W, from the second signal line 1128, the second counter electrodes 1134, and the seventh counter electrodes 1135 shown in FIG. 28. When viewed in the thickness direction T, the plurality of first counter electrodes 1132 overlap the first signal line 1126*b*, but do not overlap the second signal line 1128*b* shown in FIG. 28. When viewed in the thickness direction T, the plurality of second counter electrodes 1134 overlap the second signal line 1128*b*, but do not overlap the first signal line 1126*b* shown in FIG. 27.

As shown in FIG. 27, a strip line structure 1102 and a strip line structure 1104 are provided at respective ones of two end portions of the transmission line 1100 in the signal transmission direction S. Another strip line structure 1105 is provided between the strip line structure 1102 and the strip line structure 1104.

The strip line structure 1102 preferably includes a pair of ground conductors 1150 and 1152 (FIG. 27) at positions sandwiching the aforesaid first signal line 1126*a* in the thickness direction T, and further includes a pair of ground conductors 1158 and 1160 (FIG. 28) at positions sandwiching the second signal line 1128*a* in the thickness direction T.

The strip line structure 1104 preferably includes a pair of ground conductors 1154 and 1156 (FIG. 27) at positions sandwiching the aforesaid first signal line 1126*c* in the thickness direction T, and further includes a pair of ground conductors 1162 and 1164 (FIG. 28) at positions sandwiching the second signal line 1128*c* in the thickness direction T.

The transmission line 1100 preferably includes three sections which are: a first section A4, a second section A5, and a third section A6. The first section A4 is a section where the strip line structure 1102 is provided; the second section A5 is a section where the strip line structure 1104 is provided; and the third section A6 is a section where the strip line structure 1105 is provided between the first section A4 and the second section A5.

In the third section A6, the plurality of first counter electrodes 1132, the plurality of second counter electrodes 1134, the plurality of sixth counter electrodes 1133, and the plurality of seventh counter electrodes 1135 are arranged at intervals along the signal transmission direction S; and a part of the transmission line 1100 in the third section A6 is thinner than those in the first section A4 and the second section A5. Thus, the portion of the transmission line 1100 in the third section A6 becomes easy to bend in the thickness direction T, so that the transmission line 1100 as a multilayer substrate has high flexibility as shown in FIGS. 29 and 30. With such a configuration, the stress on the transmission line 1100 can be reduced and flexible bendability can be achieved compared to a case where, for example, a single conductor long in the signal transmission direction S is used instead of the counter electrodes 1132, 1133, 1134 and 1135.

As shown in FIGS. 27 and 28, in the transmission line 1100 according to the eleventh example embodiment, the insulator layers 1112 and 1113 are arranged with symmetrical thicknesses above and below the first signal line 1126 and the second signal line 1128. Thus, the signal transmission function by the transmission line 1100 can be further stabilized.

Twelfth Example Embodiment

A transmission line 1200 according to a twelfth example embodiment is described below with reference to the drawings.

Figure 31:
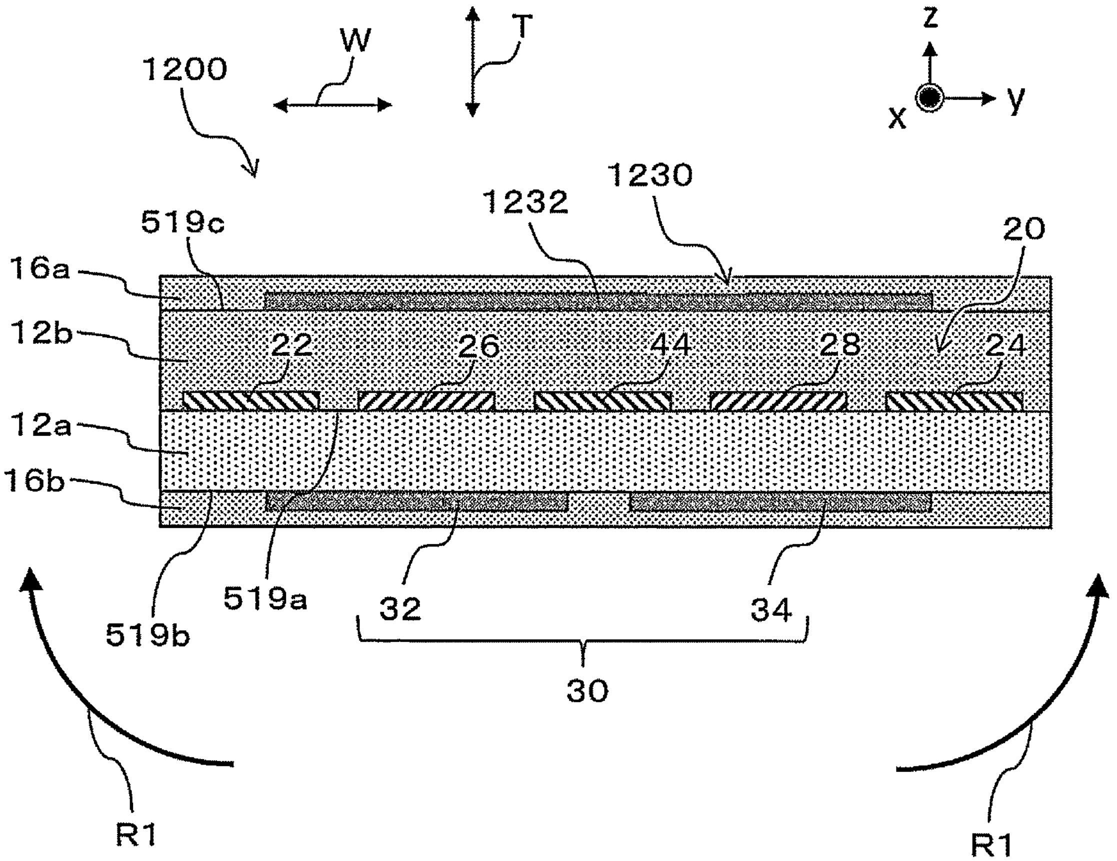
FIG. 31 is a longitudinal sectional view of a transmission line according to a twelfth example embodiment of the present invention.

FIG. 31 is a longitudinal sectional view of the transmission line 1200.

The transmission line 1200 according to the twelfth example embodiment preferably differs from the transmission line 500 according to the fifth example embodiment in that a third conductor pattern 1230 has one ground conductor 1232.

The ground conductor 1232 shown in FIG. 31 is a so-called "solid GND" and is arranged so that it overlaps, in the thickness direction T, any of the electrodes defining a first conductor pattern 20 and a second conductor pattern 30. When viewed in the thickness direction T, the ground electrode 1232 overlaps ground conductors 22, 44, and 24 and signal lines 26 and 28 of the first conductor pattern 20, and overlaps counter electrodes 32 and 34 of the second conductor pattern 30.

With such a configuration, breaking caused by bending can be effectively reduced or prevented by dividing one counter electrode into the plurality of counter electrodes 32 and 34 on one side in the thickness direction T of the transmission line 1200 and using the ground conductor 1232, which is a solid GND, on the other side in the thickness direction T of the transmission line 1200. Specifically, when the transmission line 1200 is bent in a bending direction R1 so that the counter electrodes 32 and 34 are positioned at an outer side portion, since the counter electrodes 32 and 34 are divided in the width direction W, breakage (disconnection) is less likely to be caused due to pulling.

Thirteenth Example Embodiment

A transmission line 1300 according to a thirteenth example embodiment is described below with reference to the drawings.

Figure 32:
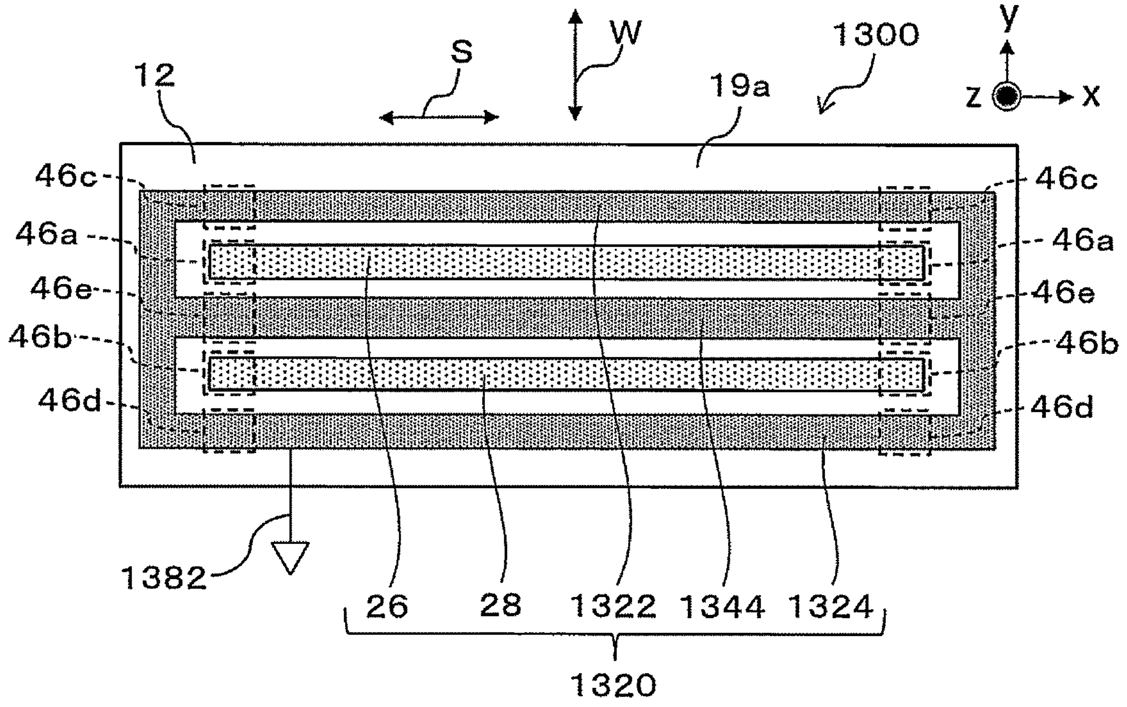
FIG. 32 is a top view showing one layer of a transmission line according to a thirteenth example embodiment of the present invention.
Figure 33:
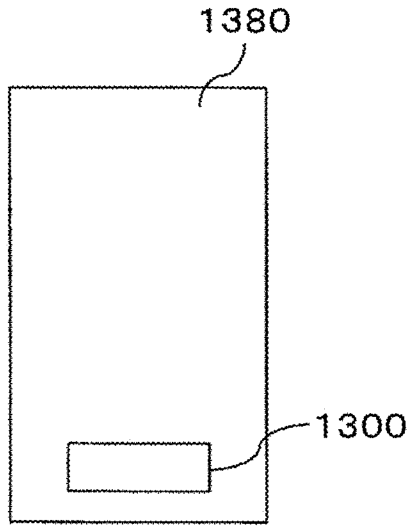
FIG. 33 is a block diagram schematically showing an electronic device incorporating the transmission line according to the thirteenth example embodiment of the present invention.

FIG. 32 is a top view showing one layer of the transmission line 1300, and FIG. 33 is a block diagram schematically showing an electronic device 1380 incorporating the transmission line 1300.

The transmission line 1300 according to the thirteenth example embodiment preferably differs from the transmission line 100 according to the first example embodiment in that ground conductors 1322, 1324 and 1344 defining a first conductor pattern 1320 are integrally provided.

As shown in FIG. 32, the first conductor pattern 1320 preferably includes signal lines 26 and 28 and the ground conductors 1322, 1324 and 1344.

The ground conductors 1322, 1324 and 1344 are preferably integrally provided and conduct each other. The first signal line 26 is arranged between the ground conductor

1322 and the ground conductor 1344, and the second signal line 28 is arranged between the ground conductor 1344 and the ground conductor 1324.

The ground conductors 1322, 1324 and 1344 are preferably connected to a reference potential, such as a ground connection 1382 shown in FIG. 32. The ground connection 1382 can be achieved by, for example, a frame ground using the chassis of the electronic device 1380 shown in FIG. 33. Although omitted in the first to twelfth example embodiments, the ground conductor may be connected to the reference potential by the same method as the ground conductors 1322, 1324 and 1344 in FIG. 32.

The electronic device 1380 is an electronic device incorporating the transmission line 1300, and uses the transmission line 1300 to transmit signals such as high-frequency signals. The electronic device 1380 may be any type of electronic device such as a cellular phone.

With the above configuration, the ground conductors 1322, 1324 and 1344 can be easily connected to the reference potential.

Other Example Embodiments

The transmission lines according to the present invention are not limited to the transmission lines 100 to 1300, but can be modified within the scope of the spirit of the present invention. The structures of the transmission lines 100 to 1300 may be combined as desired. For example, although shown in the drawings, the transmission line may have interlayer connecting conductors and outer electrodes.

For example, in the transmission line 100 of the first example embodiment, the interlayer connecting conductors pass through the insulator layer 12 in the thickness direction. In the transmission line 100, the openings 46*a* and 46*b*, which communicate with the first main surface 19*a* of the insulator layer 12 on which the first signal line 26 is provided, is provided. In contrast, for example, there may be interlayer connecting conductors connected to two end portions of the first signal line 26 and passing through the insulator layer 12 in the thickness direction T toward the second main surface 19*b* of the insulator layer 12, and openings may be provided at the second main surface 19*b* of the insulator layer 12. In such a case, for example, the outer electrodes electrically connected to the first signal line 26 via the interlayer connecting conductors are exposed from the openings. The interlayer connecting conductors are preferably formed, for example, by filling a through-hole through the insulator layer 12 with a conductive paste and solidifying the conductive paste by heating.

The outer electrodes are, for example, conductor layers formed by patterning a metal foil attached to the main surface of the insulator layer 12 in the transmission line 100 of the first example embodiment. The metal foil is, for example, copper foil. The outer electrodes may be electrically connected to an external circuit (not shown). The external circuit is an electrical circuit provided outside of the transmission line 100. The outer electrodes are provided, for example, at the end portion of the second main surface 19*b* of the insulator layer 12. Connectors, not shown, may be mounted to the outer electrodes by solder. The connectors may be connected to connectors of a circuit board (not shown). Thus, the transmission line 100 and the circuit board (not shown) may be electrically connected. The transmission line 100 may be connected to a circuit board such as an external circuit or the like by surface mounting without the connectors.

The insulator layer(s), such as the insulator layer 12, do not have to be flexible.

The material of insulator layer(s) such the insulator layer 12 may be a resin other than a thermoplastic resin, or an insulating material other than a resin. Example of the insulating material other than a resin include ceramics.

The counter electrodes, such as the first counter electrode 32, do not have to be each defined by a plurality of conductors, but may each be defined by at least one conductor.

The counter electrodes, such as the first counter electrode 32, do not have to be each connected to the same potential. For example, some of the first counter electrodes 32 may be ground conductors and the remaining first counter electrodes 32 may be floating conductors.

The conductor patterns, such as the first conductor pattern 20, do not necessarily have respective uniform line widths. In one conductor pattern, not all conductors or electrodes need to be on the same layer, but may be on different layers if so desired.

Figure 20:
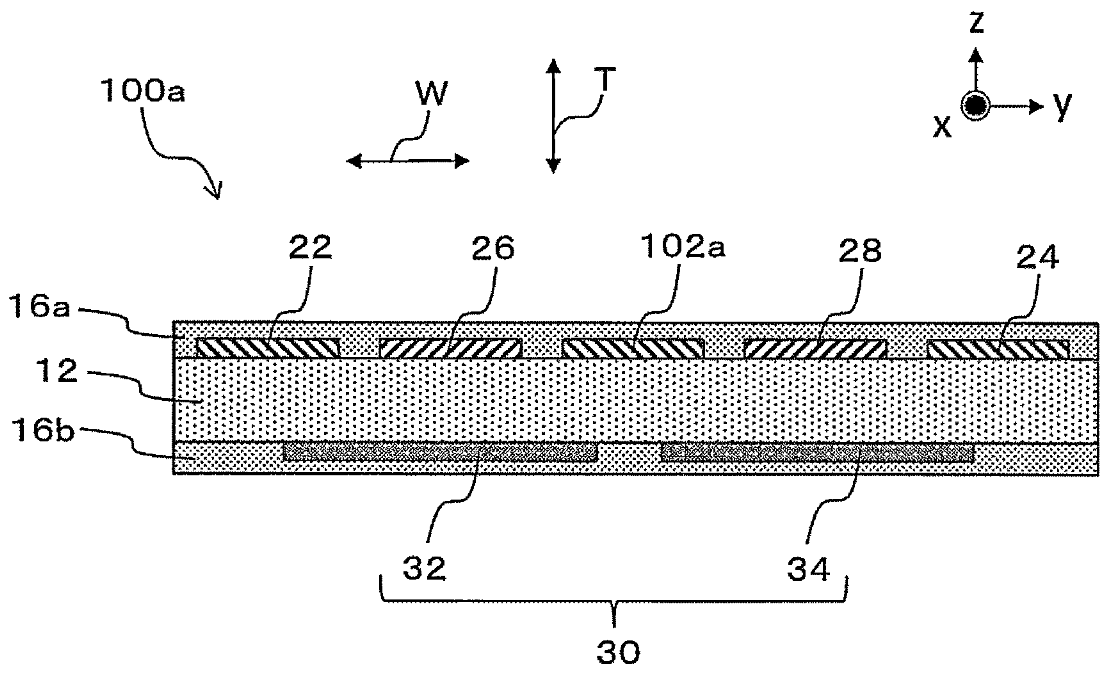
FIG. 20 is a longitudinal sectional view of a transmission line according to a variation of the first example embodiment of the present invention.
Figure 21:
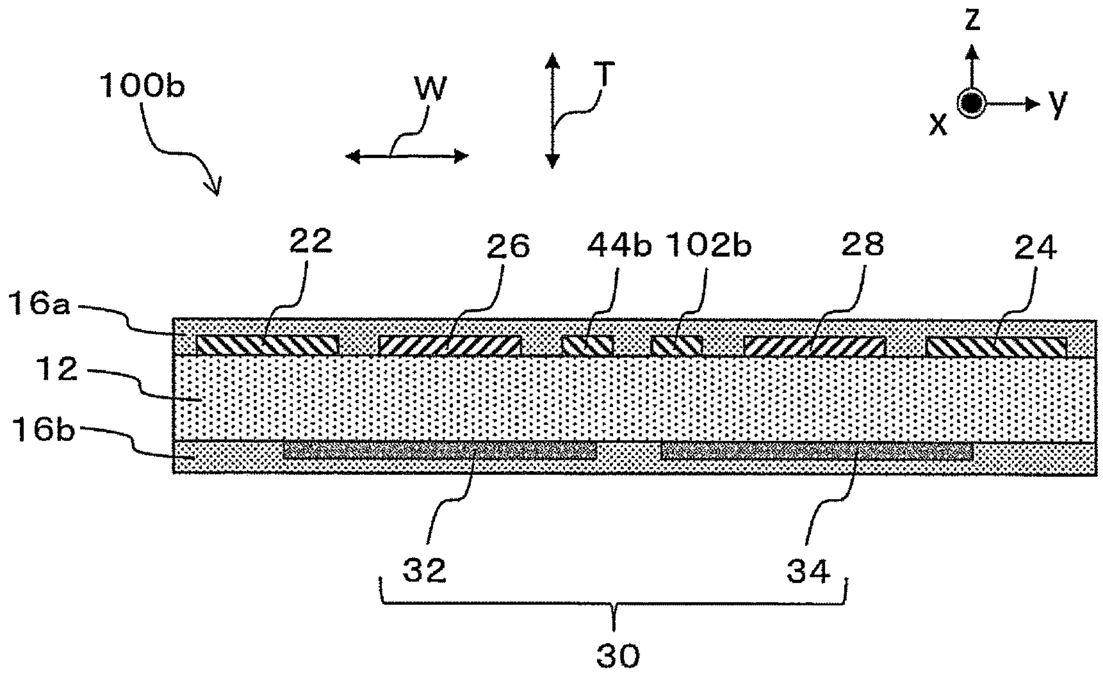
FIG. 21 is a longitudinal sectional view of a transmission line according to a variation of the first example embodiment of the present invention.

The transmission line 100 may further include a power supply line or a third signal line for low-frequency signals instead of the third ground conductor 44. Specifically, a power supply line or a third signal line 102*a* for low-frequency signals may be arranged between the first signal line 26 and the second signal line 28, as in a transmission line 100*a* shown in FIG. 20. Thus, design flexibility is increased. In the example shown in FIG. 20, the third signal line 102*a* is arranged instead of the third ground conductor 44; however, the present invention is not limited to such an example. As shown in FIG. 21, a third signal line 102*b* may be arranged together with the third ground conductor 44*b*. By arranging the third signal line 102*b* together with the third ground conductor 44*b*, shielding function can be improved.

The above variations may be applied to any example embodiments.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission line comprising:

an insulator including at least one insulator layer; and a first conductor pattern and a second conductor pattern in or on the at least one insulator layer and arranged at positions different from each other in a thickness direction of the at least one insulator layer; wherein the first conductor pattern includes a first signal line and a second signal line each extending along a signal transmission direction;

the second conductor pattern includes two or more first counter electrodes which are not in communication with the second signal line and two or more second counter electrodes which are not in communication with the first signal line;

the two or more first counter electrodes overlaps the first signal line but do not overlap the second signal line when viewed in the thickness direction;

the two or more second counter electrodes overlaps the second signal line but does not overlap the first signal line when viewed in the thickness direction;

each of the two or more first counter electrodes is not electrically connected to one another or to the two or more second counter electrodes, and each of the two or more second counter electrodes is not electrically connected to one another or to the two or more first counter electrodes; and at least one of the two or more first counter electrodes and the two or more second counter electrodes is configured such that the two or more first counter electrodes overlap along the signal transmission direction or the two or more second counter electrodes overlap along the signal transmission direction.

2. The transmission line according to claim 1, wherein the first conductor pattern further includes a ground conductor.

3. The transmission line according to claim 2, wherein the ground conductor is connected to a reference potential.

4. The transmission line according to claim 3, wherein the reference potential is a ground potential or a power supply potential.

5. The transmission line according to claim 2, wherein the ground conductor includes at least one third ground conductor arranged between the first signal line and the second signal line when viewed in the thickness direction.

6. The transmission line according to claim 5, wherein the third ground conductor includes one conductor portion overlapping both of the two or more first counter electrodes and the two or more second counter electrodes when viewed in the thickness direction.

7. The transmission line according to claim 5, wherein the at least one third ground conductor includes a plurality of third ground conductors between the first signal line and the second signal line when viewed in the thickness direction.

8. The transmission line according to claim 1, wherein no ground conductors are provided between the first signal line and the second signal line when viewed in the thickness direction.

9. The transmission line according to claim 2, wherein the ground conductor includes a first ground conductor corresponding to the first signal line and a second ground conductor corresponding to the second signal line.

10. The transmission line according to claim 1, wherein the first signal line and the second signal line are able to transmit high-frequency signals.

11. The transmission line according to claim 1, wherein the two or more first counter electrodes and/or the two or more second counter electrodes are not connected to a reference potential.

12. The transmission line according to claim 1, wherein, when a direction intersecting the signal transmission direction is a width direction, a length of the two or more first counter electrodes in the signal transmission direction is shorter than a length of the two or more first counter electrodes in the width direction when viewed in the thickness direction.

13. The transmission line according to claim 1, wherein the two or more first counter electrodes and the two or more second counter electrodes are arranged at positions deviated from each other in the signal transmission direction.

14. The transmission line according to claim 1, further comprising:

a third conductor pattern provided on a side of the first conductor pattern opposite to a side on which the second conductor pattern is located in the thickness direction; wherein the third conductor pattern includes at least one of one or more third counter electrodes that overlap the first signal line but do not overlap the second signal line when viewed in the thickness direction and one or more fourth counter electrodes that overlap the second signal line but do not overlap the first signal line when viewed in the thickness direction.

15. The transmission line according to claim 1, further comprising a strip line structure or a microstrip line structure on at least one or another side of the two or more first counter electrodes and the two or more second counter electrodes in an extension direction of the first signal line.

16. The transmission line according to claim 1, further comprising:

a power supply line; wherein the power supply line is between the first signal line and the second signal line when viewed in the thickness direction.

17. The transmission line according to claim 1, further comprising:

a third signal line for low-frequency signals; wherein the third signal line is between the first signal line and the second signal line when viewed in the thickness direction.

18. The transmission line according to claim 1, wherein the signal transmission direction is orthogonal or substantially orthogonal to the thickness direction.

19. An electronic device comprising the transmission line according to claim 1.

* * * * *